(12) United States Patent
Sieracki et al.

(10) Patent No.: US 9,070,012 B1
(45) Date of Patent: Jun. 30, 2015

(54) SYSTEM AND METHOD FOR UNCUED DISCRIMINATION OF BATED FEATURES IN IMAGE

(71) Applicants: Jeffrey Mark Sieracki, Silver Spring, MD (US); John J. Dellomo, Silver Spring, MD (US)

(72) Inventors: Jeffrey Mark Sieracki, Silver Spring, MD (US); John J. Dellomo, Silver Spring, MD (US)

(73) Assignee: SR2 Group, LLC, Clarksville, MD (US)

( * ) Notice: Subject to any disclaimer, the term of this patent is extended or adjusted under 35 U.S.C. 154(b) by 136 days.

(21) Appl. No.: 13/740,049

(22) Filed: Jan. 11, 2013

Related U.S. Application Data

(60) Provisional application No. 61/585,571, filed on Jan. 11, 2012.

(51) Int. Cl.
*G06K 9/50* (2006.01)
*G06K 9/00* (2006.01)

(52) U.S. Cl.
CPC .................................. *G06K 9/00503* (2013.01)

(58) Field of Classification Search
USPC ......................................... 382/190–193, 170
See application file for complete search history.

(56) References Cited

U.S. PATENT DOCUMENTS

| | | | |
|---|---|---|---|
| 6,122,407 A | 9/2000 | Peters | |
| 6,226,409 B1 | 5/2001 | Cham et al. | |
| 7,079,986 B2 | 7/2006 | Sieracki | |
| 7,584,396 B1 * | 9/2009 | Cormode et al. | 714/746 |
| 7,920,724 B2 | 4/2011 | Che et al. | |
| 8,059,154 B1 | 11/2011 | Kiro et al. | |
| 8,135,191 B2 | 3/2012 | Rao et al. | |
| 8,271,200 B2 | 9/2012 | Sieracki | |
| 8,407,028 B2 * | 3/2013 | Sieracki | 702/189 |
| 8,805,083 B1 * | 8/2014 | Sieracki | 382/191 |
| 2003/0068082 A1 | 4/2003 | Comaniciu et al. | |
| 2009/0148046 A1 | 6/2009 | Bascle et al. | |
| 2009/0153379 A1 * | 6/2009 | Cormode et al. | 341/94 |
| 2010/0332475 A1 | 12/2010 | Birdwell et al. | |

(Continued)

FOREIGN PATENT DOCUMENTS

WO 2012018303 A1 2/2012

OTHER PUBLICATIONS

Comaniciu, D. and P. Meer, Distribution Free Decomposition of Multivariate Data, Pattern Analysis & Applications, vol. 2, pp. 22-30, 1999.

(Continued)

*Primary Examiner* — Jingge Wu
(74) *Attorney, Agent, or Firm* — Rosenberg, Klein & Lee

(57) ABSTRACT

A system and method are provided for uncued discrimination of a bated spatial pattern in an image electronically rendered as a frame of image data points. A reference unit establishes a general dictionary of predefined multi-dimensional reference functions, and a candidate detection unit pre-screens the frame of image data points to identify therein at least one candidate grouping of image data points collectively indicative of a predetermined spatial pattern. A sparse approximation unit coupled to the candidate detection and reference units computes for each candidate grouping an optimal reference function defined with respect to the general dictionary. The optimal reference function of each candidate grouping is projected onto a corresponding portion of the image data frame defined thereby. Each projected portion is extracted from the image data frame to leave a residual image data frame which, during iterative execution, provides the image data frame for the immediately succeeding iteration.

25 Claims, 28 Drawing Sheets

(56) References Cited

U.S. PATENT DOCUMENTS

2011/0153633 A1 6/2011 Napper et al.
2012/0250764 A1* 10/2012 Martin et al. ............ 375/240.12

OTHER PUBLICATIONS

Comaniciu, D. and P. Meer, Mean Shift Analysis and Application in Proceedings 7th International Conference on Computer Vision, Kerkyra, Greece, Sep. 1999, pp. 1197-1203.

* cited by examiner

SYSTEM AND METHOD FOR UNCUED DISCRIMINATION OF BATED FEATURES IN IMAGE

RELATED APPLICATION DATA

This Application is based on Provisional Patent Application No. 61/585,571, filed 11 Jan. 2012.

BACKGROUND OF THE INVENTION

The present invention is directed to a system and method applicable to the field of signal processing for signature and feature detection, particularly in images or image like data sets. More specifically, the present invention is directed to a system and method for carrying out uncued detection and extraction of linear, curvilinear, or other patterned features in an image, even when they are bated and faintly discernable. In particular, the system and method enable the discrimination and/or recovery of patterned objects or features in low contrast imagery, the de-noising of images, removing of features from images, and the like.

The present invention applies certain aspects of methods and systems previously disclosed in U.S. patent application Ser. No. 10/748,182 (now U.S. Pat. No. 7,079,986), entitled "Greedy Adaptive Signature Discrimination System and Method" and that filing is hereby incorporated by reference and hereinafter referred to as [1], as well as certain aspects of methods and systems previously disclosed in U.S. patent application Ser. No. 11/387,034 (now U.S. Pat. No. 8,271,200), entitled "System and Method For Acoustic Signature Extraction, Detection, Discrimination, and Localization" that is hereby incorporated by reference and hereinafter referred to as [2].

SUMMARY OF THE INVENTION

It is an object of the present invention to provide a system and method for automatically and accurately discriminating patterned features of an image, even when they are bated and faintly discernable.

It is another object of the present inventions to provide a system and method for automatically and accurately discriminating patterned features of an image in uncued manner.

These and other objects are attained by a system and method formed in accordance with the present invention for uncued discrimination of a bated spatial pattern in an image electronically rendered as a frame of image data points. A system formed in this regard comprises a reference unit establishing a general dictionary of predefined multi-dimensional reference functions, as well as a candidate detection unit pre-screening the frame of image data points to identify therein at least one candidate grouping of image data points collectively indicative of a predetermined spatial pattern. A sparse approximation unit is coupled to the candidate detection unit and the reference unit, which sparse approximation unit computes for each candidate grouping an optimal reference function defined with respect to the general dictionary. The sparse approximation unit projects the optimal reference function of each candidate grouping onto a corresponding portion of the image data frame defined thereby. Each projected portion is extracted from the image data frame to leave a residual image data frame. During iterative execution of the candidate detection and sparse approximation units, the residual image data frame of each iteration provides the image data frame for the immediately succeeding iteration.

A method for uncued discrimination of a bated spatial pattern in an image electronically rendered as a frame of image data points, comprises establishing a general dictionary of predefined multi-dimensional reference functions. The method further comprises executing candidate detection in a processor to pre-screen the frame of image data points to identify therein at least one candidate grouping of image data points collectively indicative of a predetermined spatial pattern. A sparse approximation is executed in a processor to compute for each candidate grouping an optimal reference function defined with respect to the general dictionary, which sparse approximation includes projecting the optimal reference function of each candidate grouping onto a corresponding portion of the image data frame defined thereby. Each projected portion is extracted from the image data frame to leave a residual image data frame. During iterative execution of the candidate detection and sparse approximation, the residual image data frame of each iteration provides the image data frame for the immediately succeeding iteration.

In certain embodiments, a method is provided for uncued discrimination of a bated structural feature in a frame of spatially referenced data points. The method comprises establishing a general dictionary of predefined multi-dimensional reference functions, and executing candidate detection in a processor to pre-screen the frame of spatially referenced data points to identify therein at least one candidate grouping of data points collectively indicative of a predetermined structural feature. A sparse approximation is executed in a processor to compute for each candidate grouping an optimal reference function defined with respect to the general dictionary. The sparse approximation includes projecting the optimal reference function of each candidate grouping onto a corresponding portion of the data frame defined thereby, each projected portion being extracted from the data frame to leave a residual data frame. During iterative execution of the candidate detection and sparse approximation, the residual data frame of each iteration provides the data frame for the immediately succeeding iteration.

BRIEF DESCRIPTION OF THE DRAWINGS

Figures 8A, 8B:
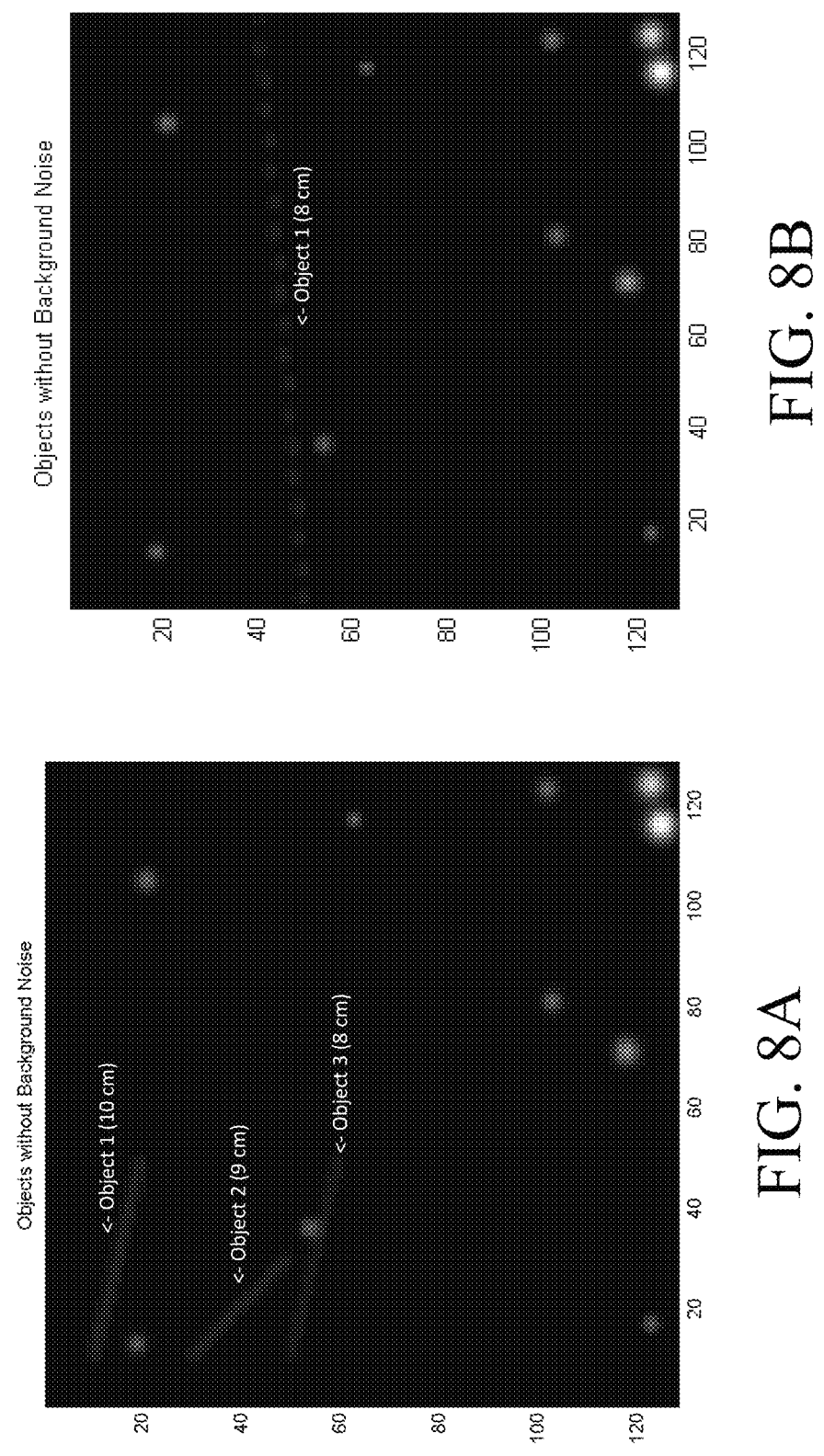

FIG. 8A is a graphic plot of a sample image without background noise for demonstrative processing in a first sample case, using a decomposition subsystem formed in accordance with an exemplary embodiment of the present invention;

FIG. 8B is a graphic plot of a sample image without background noise for demonstrative processing in a second sample case, using a decomposition subsystem formed in accordance with an exemplary embodiment of the present invention;

FIGS. 9A-1 and 9B-1 are inverse exposure plots respectively corresponding to the graphic plots of FIGS. 9A-9B, included for explanatory purposes;

FIGS. 10A-1, 10B-1, and 10C-1 are inverse exposure plots respectively corresponding to the graphic plots of FIGS. 10A-10C, included for explanatory purposes;

DETAILED DESCRIPTION OF THE PREFERRED EMBODIMENTS

Figure 1:
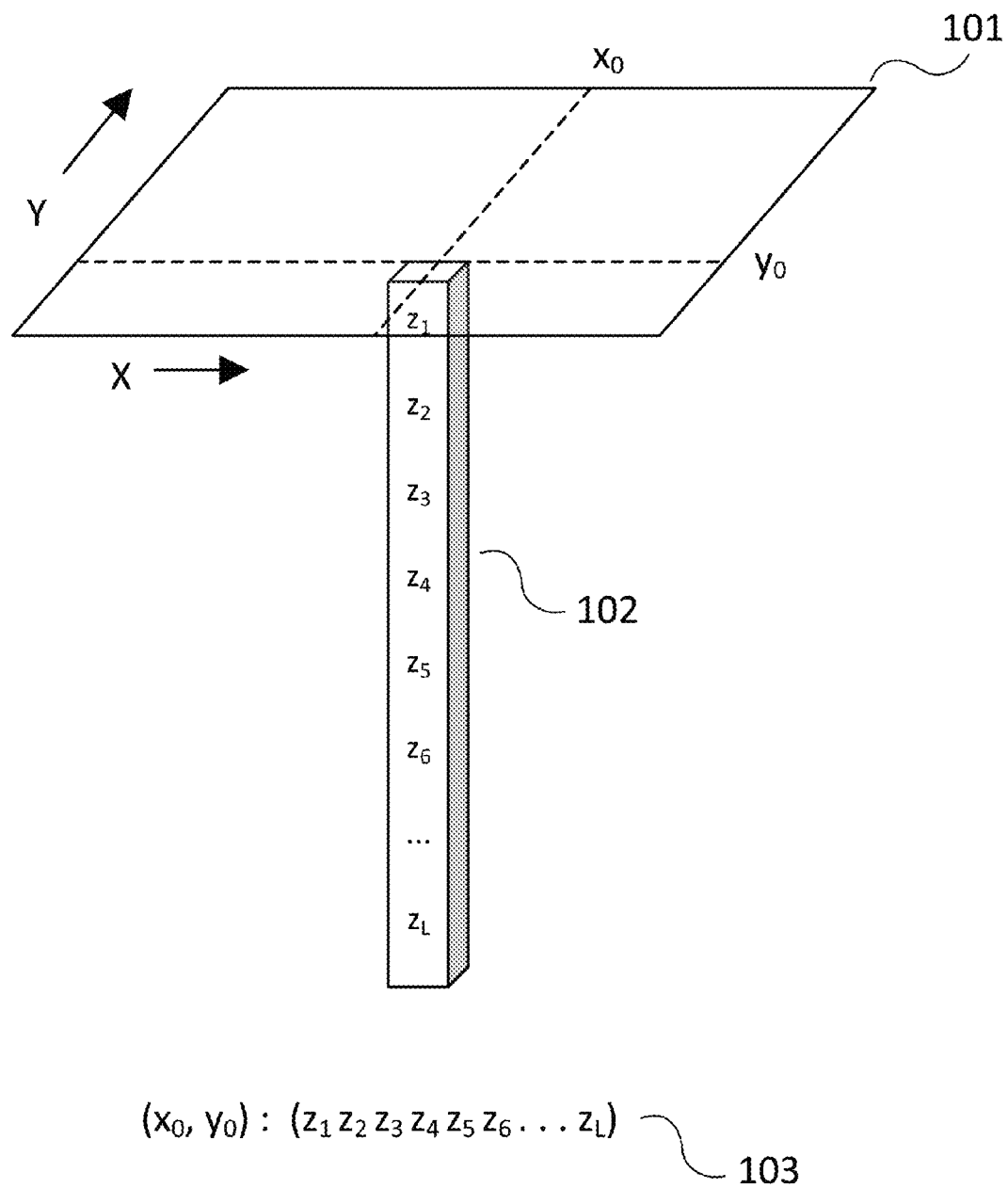
FIG. 1 is schematic diagram illustratively representing a pixel of image data having complex spectral content within a spatial image plane of pixels.

Briefly, the subject system and method provide for the effective detection and extraction of linear, curvilinear, or other such structural, or patterned, features in an image, even when they are bated and faintly discernable. The system and method thereby enable the accurate discrimination and/or recovery of patterned objects or other such features from low contrast, low intensity, or high noise images where the objects/features of interest is otherwise quite difficult to discriminate from the surrounding portions of the images. Moreover, the system and method provide for such discrimination in uncued manner—that is, without the aid of any pre-existing indicia or a priori knowledge (for instance, a prescribed region of an image to expect the features) to 'cue' the discrimination process.

The system and method iteratively execute a transform-aided form of greedy adaptive discrimination (GAD)-type sparse decomposition on the given image data to provide a rapid yet reliable mechanism for extracting even highly bated image features of interest. The features of interest may be those which appear on the image with certain spatial patterns, even if very faintly so. Depending on the particular requirements of the intended application, the spatial patterns may include straight line segments, curvilinear segments, or other shaped segments. The term 'spatial patterns' is used in a broad sense herein, and encompasses in addition to patterns collectively defined by a set of spatially displaced image data points temporal patterns affecting the image data collected over a certain time period in one or more image frames. If these temporal patterns track over the time period across spatially displaced image data points, they effectively form spatial patterns across those points, and therefore also referred to as such herein.

GAD-type sparse decomposition of image data is proven to be highly effective in discriminating groups of related image data points (collectively defining a patterned feature of interest, for instance) according certain characteristic reference functions, or atoms, selected from a predetermined dictionary of reference functions. The processing load of such decomposition over all the data of a given image, however, may prove prohibitive in many applications where rapid yet reliable discrimination of features is necessary. The subject system and method leverage the benefits of GAD-type sparse approximation and known feature extraction techniques, like Hough transformation, to realize that type of rapid, reliable discrimination of patterned features in an image, bated though they may be.

In certain exemplary embodiments, the subject system and method first applies a suitable feature extraction technique to one or more frames of image data to significantly reduce the groupings of image data points requiring sparse approximation processing in order to discriminate those which actually define patterned features of interest. An image typically includes a plethora of image data point groupings collectively defining a wide range of image features. As effective as it is at simultaneously considering and discovering related—or otherwise 'connected'—image data points, even a GAD-type sparse approximation would not be of much practical use if burdened with execution upon each and every conceivable grouping of image data points within the image. Thus, image data is effectively pre-screened in the subject system and method, using a suitable feature extraction technique such as a Hough transform, for example, to estimate a set of one or more candidate groupings each potentially defining a patterned feature of interest. It is only after the pool of image data point groupings in the given image is reduced to a manageable size in this way that sparse approximation, preferably a GAD-type sparse approximation, is carried out. The sparse approximation is thereby guided to focus efficiently upon only those groupings of image data points that may actually be fruitful in discovering only those patterned image features of interest.

The sparse approximation is preferably carried out by adaptively generating for each candidate grouping of image data points which have been estimated by the pre-screening process a reduced, or indexed, dictionary containing only those atoms drawn from the general dictionary found to be consistent with that candidate grouping. A GAD-type sparse approximation is simultaneously applied to the grouped image data points to express them collectively in terms of one or more (preferably one in the illustrated example) prototype atoms of the index dictionary. The selected, or optimal, atom for each candidate grouping is comparatively tested against a predetermined detection amplitude threshold. Each candidate grouping which passes is then projected onto that portion of the image data frame corresponding to the grouped image data points. The projected portion is thereafter extracted from the image data to leave a residual image data frame. The extracted portion of the image is collected, and the residual image data frame is stored to serve as the image data frame of the immediately succeeding iteration.

This process is iteratively carried out over a predetermined number of executions or until predetermined stopping criteria are satisfied, after which the extracted portions of the image collected over the iterative executions are combined to reconstruct the image. The effect of such reconstruction is to visually highlight patterned features of interest which may have been faint and therefore obscured and difficult to discern in the original image.

Specific applications of the system and method disclosed herein include use in various machine vision contexts. For example, suitable embodiments of the system and method find application in: (1) Near Earth, and Low Earth Orbit object, and other astronomical object detection, (2) optical and multi-spectral sensor image enhancement, (3) machine vision applications in recovery of feature details in low contrast lighting, (4) Sensing and Image Analysis, and (5) Robotic Vision. Related applications will be apparent in, for example, feature recovery in medical imagery for diagnostic purposes, structural inspections, luggage and passenger screening, exploration of large datasets, and other contexts necessitating the recovery of structured feature details.

While the subject system and method are widely applicable to image applications, its applicability is not necessarily limited to image applications, per se. For example, they may in certain applications be used for the uncued discrimination, generally, of bated structural features in one or a collection of electronically rendered frames of spatially referenced data points.

Without limitation, certain exemplary embodiments of the subject system and method may be employed specifically in the context of detecting faint lines in high noise images, where such lines represent the path traced by a moving object in a space observation system. Additionally, without limitation, certain embodiments of the subject system and method may be employed specifically in the context of detecting data structures that are modeled by straight line paths. In other contexts, the data structures to be detected may form other parameterized paths. If a Hough transform were also employed in those cases to guide the sparse decomposition, the transform would be accordingly modified in any suitable manner known in the art. Furthermore, certain exemplary embodiments of the subject system and method may be employed to process one sensor image at a time, or simultaneously to grouped stacks of images by replacing the greedy cost function used for sparse approximation with an overall norm (such as a P-norm, as described in [1]. In these and other contexts, the subject system and method provide for the efficient detecting, estimating, and tracking of objects or features in image data, guided by transform or other suitable operation for pre-screened feature extraction.

In contrast to image processing approaches heretofore known, the subject system and method does not rely on fixed decomposition spaces. Instead, they carry out a data-adaptive, mathematically "sparse" tiling of a given image field. This is obtained through iterative execution steps that inherently compensate for signal-to-signal variation in numerous dimensions, collapsing loosely grouped image data signals into tight joint estimates of underlying information content. The effect is to concentrate salient data into a very low-dimensional representation space in which one can quickly and reliably make judgments.

Specific applications of the subject system and method in the detection and tracking of airborne objects, for example, demonstrate their effectiveness in resolving objects significantly under 10 cm from ground-based electro-optic sensor data. In such applications as those for detecting and tracking Low Earth Orbit (LEO), for instance, "grouped signals" may comprise image pixels data from the same exposure frame, from time integrated exposures, or from stacks of related images collected over time or in multi-spectral bands.

In these applications, automatic detection and tracking of objects at greater than or equal to 14th magnitude presents a significant challenge for today's electro-optic sensor systems. For LEO objects, a particular challenge is presented by the combination of sensor limitations and unknown orbit. If an orbit is known a priori, one can knowingly track the orbiting object, integrating over time to increase effective sensitivities. But unlike geosynchronous (GEO) objects, LEO objects have widely varying ranges of potential orbits. The single-frame acquisition brightness of such an object is often at or near the limit of delectability—falling not far above the combined noise floor set by the given image capture device (such as a CCD) and sky background luminosity. Without time-integration, it typically becomes difficult or impossible for automated processing measures to detect a track. Surveillance of the sky in search of new objects may require a search over large volumes of data, so it is important to automate detection and tracking insofar as possible.

Humans have a remarkable ability to detect faint patterns in noise. Once data is translated or amplified by sensors into a form that we can see, our brains can often detect patterns, anomalies, movement, and changes that are beyond the ability of automated image processing measures. In part, this is because top-down cognitive processing guides interpretation of data. Humans are wired to integrate information in spatial and temporal dimensions, in order to resolve patterns rather than to assess data points in isolation. The subject system and method effect a similarly guided approach to image processing, accomplished mathematically in the general context of sparse representations. A data-adaptive, sparse signal decomposition is used to identify and combine weakly correlated pieces of image information, guided in a top-down fashion, by seeking specific structures (or patterned features) across the data.

Accordingly, certain GAD [1], [2] concepts are suitably employed by the subject system and method, advantageously combined with additional measures to rapidly address problems encountered in the sparse decomposition of images, which have heretofore hindered the reliable discrimination of features even in two-dimensional (2D) images. Certain fundamental aspects drawn from GAD include finding joint information about a group of signals and collapsing that information into a relatively small set of significant coefficients which are low-dimensional (i.e. "sparse") in comparison to the vector space of the original signal datasets. The disclosed approach to the low contrast feature discovery problem is to obtain a parametric representation of the data that sparsely tiles the key areas of the image. Rather than performing a complete image decomposition and seeking to make sense of a large coefficient space, the decomposition is guided to resolve components likely to be objects of interest (such as LEO objects in the preceding example) in relatively few processing steps.

Figure 7A:
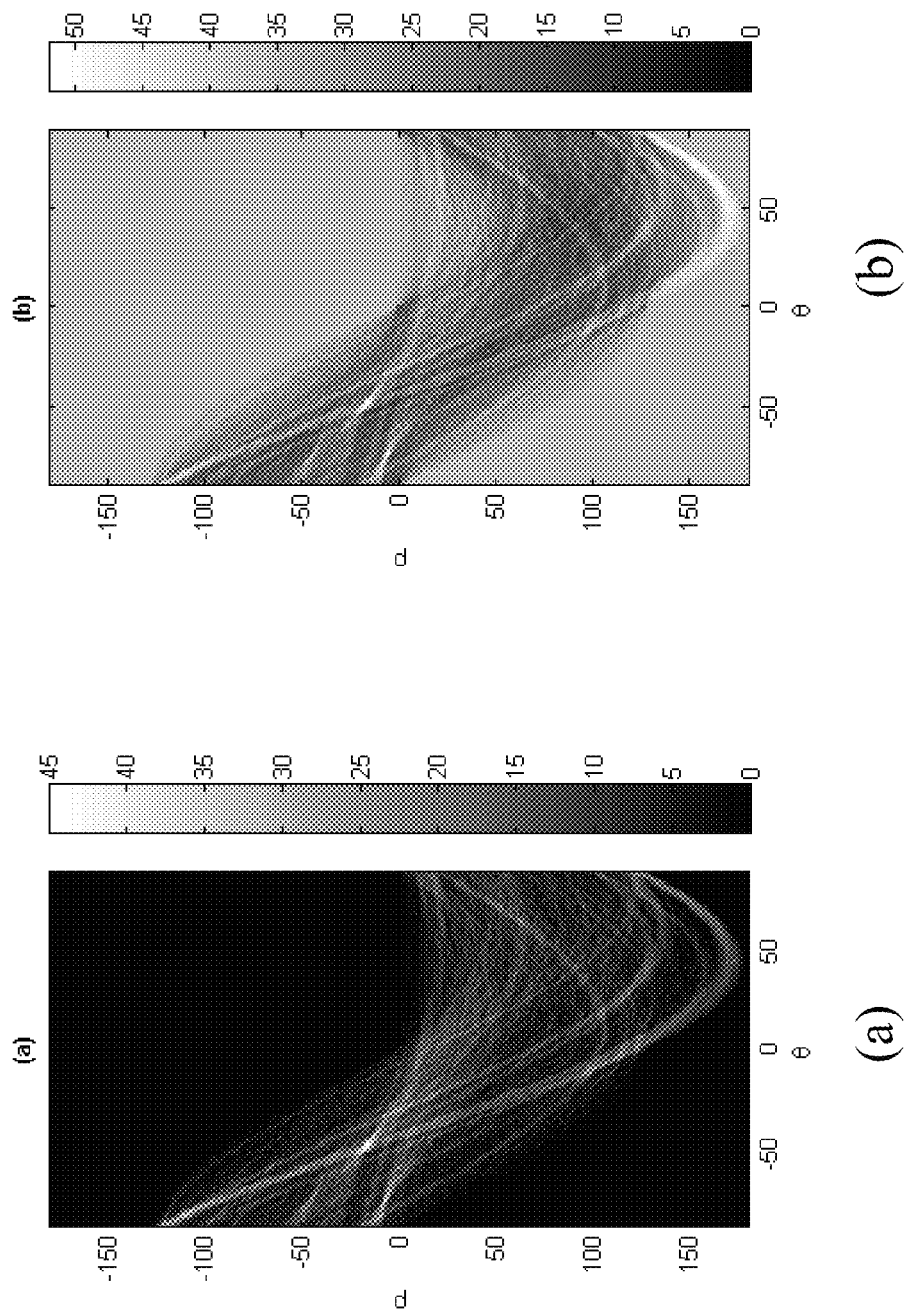
FIG. 7A is a comparative set of graphic plots illustrating examples of a Hough transformed signal and a re-normalized version thereof.

Feature Extraction—Use of Hough Transform for Detecting Lines in Noisy Image Data Referring now to FIG. 7A, known approaches in the art to finding lines in images are generally based on edge detection techniques, combined with transforms sensitive to linearity. Techniques such as direction-sensitive 2D wavelet decompositions have also been applied.

In the exemplary embodiments disclosed, aspects of line detection are combined with greedy sparse decomposition. In the disclosed examples, the fundamental decomposition of an image rely on linearly oriented Gaussian atoms—that is, directionally rotated 2D Gaussian functions with scale along the major axis typically longer than that along the orthogonal axis. Each of these Guassian atoms is parameterized by its position, orientation in space, peak width, standard deviation, length, and amplitude. The atoms form an infinitely redundant spanning set of the space of possible data in a 2D image plane. They are related to a 2D Gabor dictionary. To resolve the redundancy, a greedy decomposition of the image space is employed. This greedy decomposition operates to decompose an image stepwise, selecting the best dictionary function fit to an image, removing the fit component, and then iteratively repeating the same on the residual image until certain stopping criteria are met. The dictionary and stepwise cost functions are suitably designed to mathematically guarantee convergence to a quasi-optimal decomposition. In this way, the greedy decomposition is guided not simply by the best stepwise fit to the residual image, but by a cost function that is preferably derived from a Hough transformed space thereof. Thus, a weighted combination of atom linearity and residual fit energy is considered in optimizing the decomposition.

A Hough transform is typically used in image processing to help identify a preponderance of points that lie along lines or other connected curves. It is typically applied after an edge-detection algorithm has been run on an image, and serves to combine pixel values from a flat, binary-valued image in a manner that, in essence, creates a 2D histogram of the density of co-linear points, indexed by the line's distance from the origin and angle of slope. The peaks of this histogram help identify specific, line-like structures in the image. FIG. 7A(a) illustrates an example of the a typical Hough Transformed space.

The transform typically weights all potential lines equally, regardless of their location in the frame. However, there is an underlying correlation between the location of a line in the frame and its possible length. For example, lines near a corner are more likely to be truncated than lines in the center. Therefore in applying the Hough transform in the exemplary embodiments disclosed, the transformed data is preferably normalized to compensate in this regard for distribution statistics. FIG. 7A(b) illustrates a re-normalized version of the Hough transform shown in FIG. 7A(a).

The Hough transform by itself is not sufficiently effective to discriminate lines (or other patterned feature of interest) in images having high background noise. Peaks that would correspond to targets of interest may be completely obscured by random spurious correlation. If applied indiscriminately to a very low single to noise ratio (SNR) setting, a standard Hough transform approach would typically yield a large set of randomly distributed local maxima, from which embedded target lines could be reliably identified.

The exemplary embodiment makes use of the Hough transform not to carry out primary detection, but rather to pre-screen the image data to estimate a candidate list of weakly linear structures for further evaluation. During each iterative sequence of execution, the subject system and method select from the candidate structures using a greedy choice function in order to find a quasi-linear brightness track component amongst the noise. The Hough transform thus defines, during each iteration. an index into the dictionary being referenced, in this particular case a redundant 2D oriented Gaussian dictionary, thereby reducing the possible search space. An optimized fit may be performed then on a comparatively small subspace of choices. With reference to Matching Pursuits techniques, this is consistent with the concept of generating an index dictionary. However, rather than generating a fixed index as is heretofore done, we instead generate an index dynamically at each step of our algorithm.

Feature Extraction Guided Sparse Decomposition

Preferably, the feature extraction guided sparse decomposition implemented for discriminating patterned features of an image in the exemplary embodiments disclosed employs a Hough transformation-based pre-screening process to guide a GAD-type sparse decomposition. This is carried out in stepwise, or iteratively executed manner. The decomposition process may be outlined as follows. First, let D denote a dictionary of 2D oriented Gaussian atoms, $g(x_0, y_0, x_1, y_1, \sigma_1, \sigma_2) \in D$. Let $I_0$ denote an image of interest, expressed as a de-meaned (average 0), real-valued matrix. Let $H_{ref}$ denote the Hough transform of a unit valued matrix of same size. Let $\epsilon$ denote a predefined minimum detection amplitude, and $l_{min}$ denote a minimum linearity span.

Upon initializing the iteration index i=0, the decomposition proceeds as follows during each iteration step of execution:

1. Establish $I_{thresh}$ as an indicator matrix where:

$I_{thresh}(x,y) = 1 \leftrightarrow I_i(x,y) > \mu(I_0) + k\sigma(I_0)$.

2. Find $H = \text{Hough}(I_{thresh})$.
3. Normalize, setting $$H = H - \frac{\max(H)}{\max(H_{ref})} H_{ref}.$$

4. For the peak in H, estimate a set S of potential contributing line segments in $I_{thresh}$.
5. Preferably, apply a gap filling algorithm to each estimated segment in S to satisfy a minimum segment length criteria $l_{min}$.
6. Sort segments in S by length.
7. For each candidate segment s∈S, carry out the following:
   a. Define $D_i \subset D$ where each $g_\gamma \in D_i$ is consistent with the candidate segment s.
   b. Search for $g_i \in D_i$, such that $|\langle g_i, I_i \rangle| = \sup_{g_\gamma \in D_i} |\langle g_\gamma, I_i \rangle|$.
   c. If $|\langle g_i, I_i \rangle| > \epsilon$ exit, else consider next candidate.
8. Set $I_{i+1} = I_i - \langle g_i, I_i \rangle g_i$.
9. Set i=i+1 and iterate until predetermined stopping criteria are met.

In this exemplary embodiments disclosed herein, the minimum detection amplitude $\epsilon$ is set in value to the given machine epsilon value. (Machine epsilon refers to an upper bound on relative error in computational systems, and corresponds roughly to the smallest number difference that may be accurately represented and processed.) Stopping criteria may suitably comprise either a fixed number of steps/iterations or a test on the residual information. In practice, the requisite stopping parameter values to achieve reliable target detection for particular applications are readily ascertained by those skilled in the art.

Figure 7B:
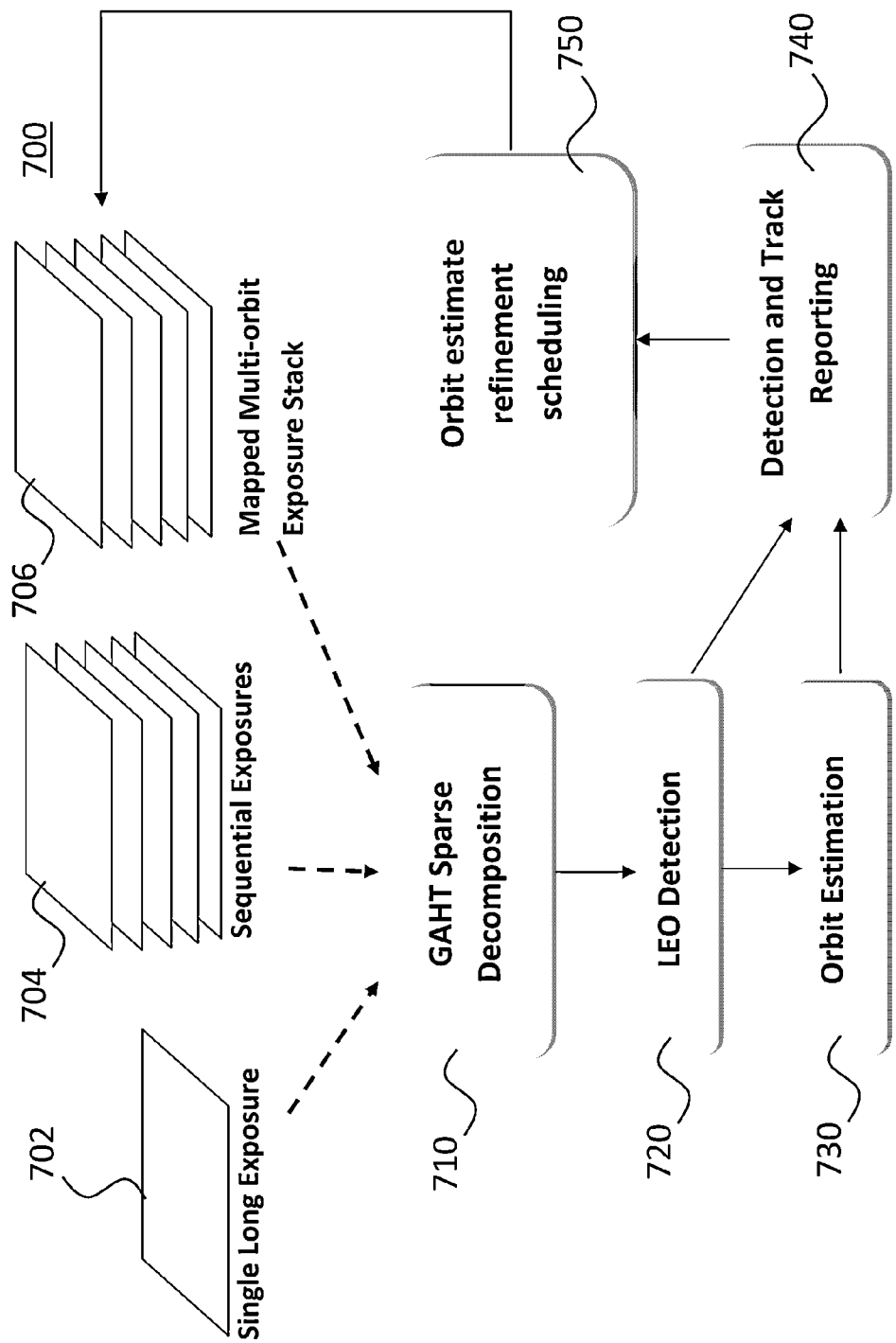
FIG. 7B is a block diagram schematically illustrating the intercoupling of functional processes in a certain application of a decomposition subsystem formed in accordance with an exemplary embodiment of the present invention.
Figure 8D:
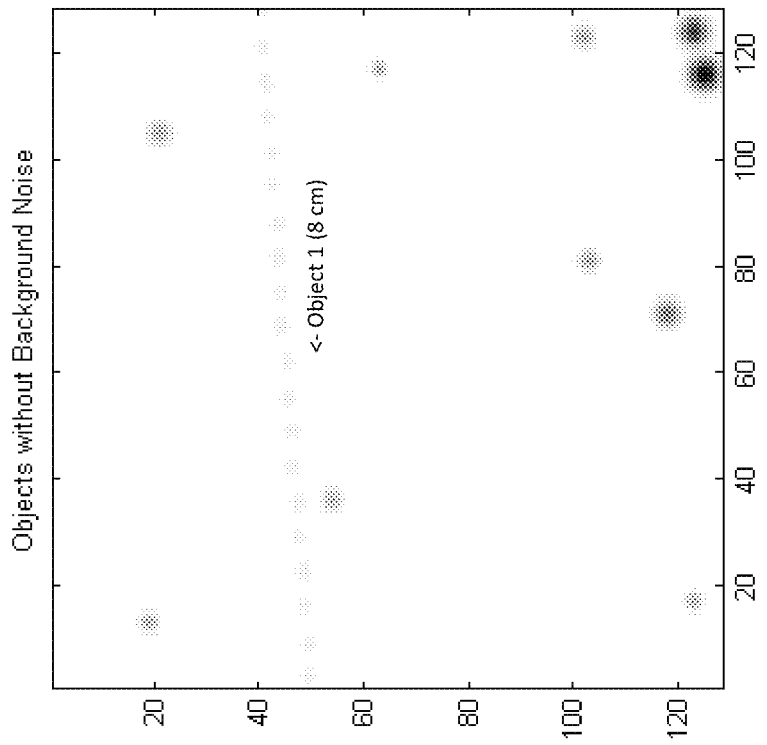
FIGS. 8C-8D are inverse exposure plots respectively corresponding to the graphic plots of FIGS. 8A-8B, included for explanatory purposes.
Figure 8C:
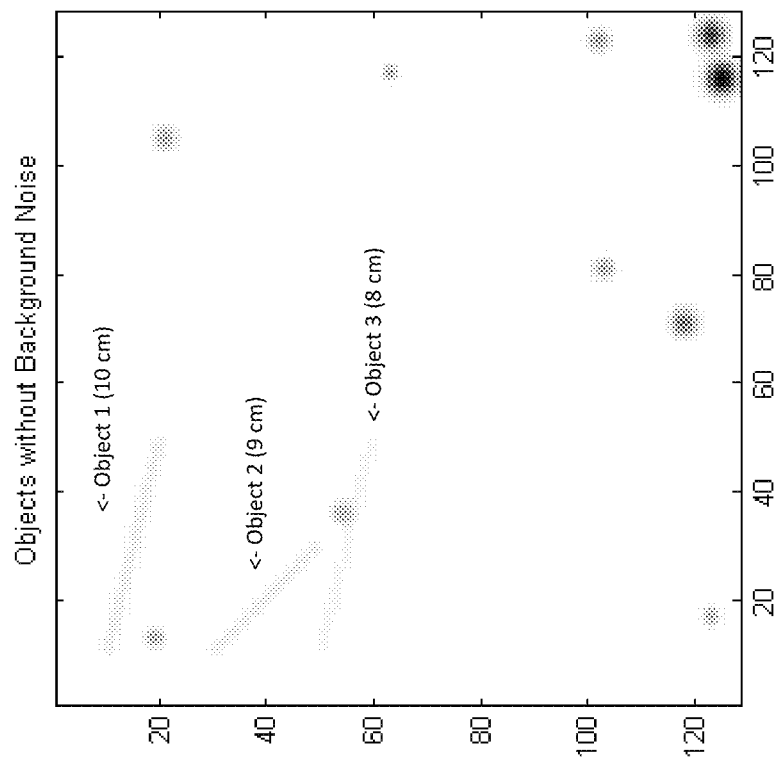

The flow of processes carried out during and in connection with each iteration of execution is described in more detail in following paragraphs. The illustrated decomposition process, as discussed further below, may be extended to operate on stacks of multiple images, in addition to individual images. The decomposition process may operate upon integrated, long exposures, sequential sets of exposures, or spatially mapped multi-orbit acquisition sets of exposures, as indicated in the schematic diagram of FIG. 7B (schematically illustrating the intercoupling of functional processes in connection with the Application Example for LEO detection described in following paragraphs). Dictionaries other than 2D Gaussian functions may be referenced in alternate embodiments without departing from the spirit and scope of the present invention.

Figure 11:
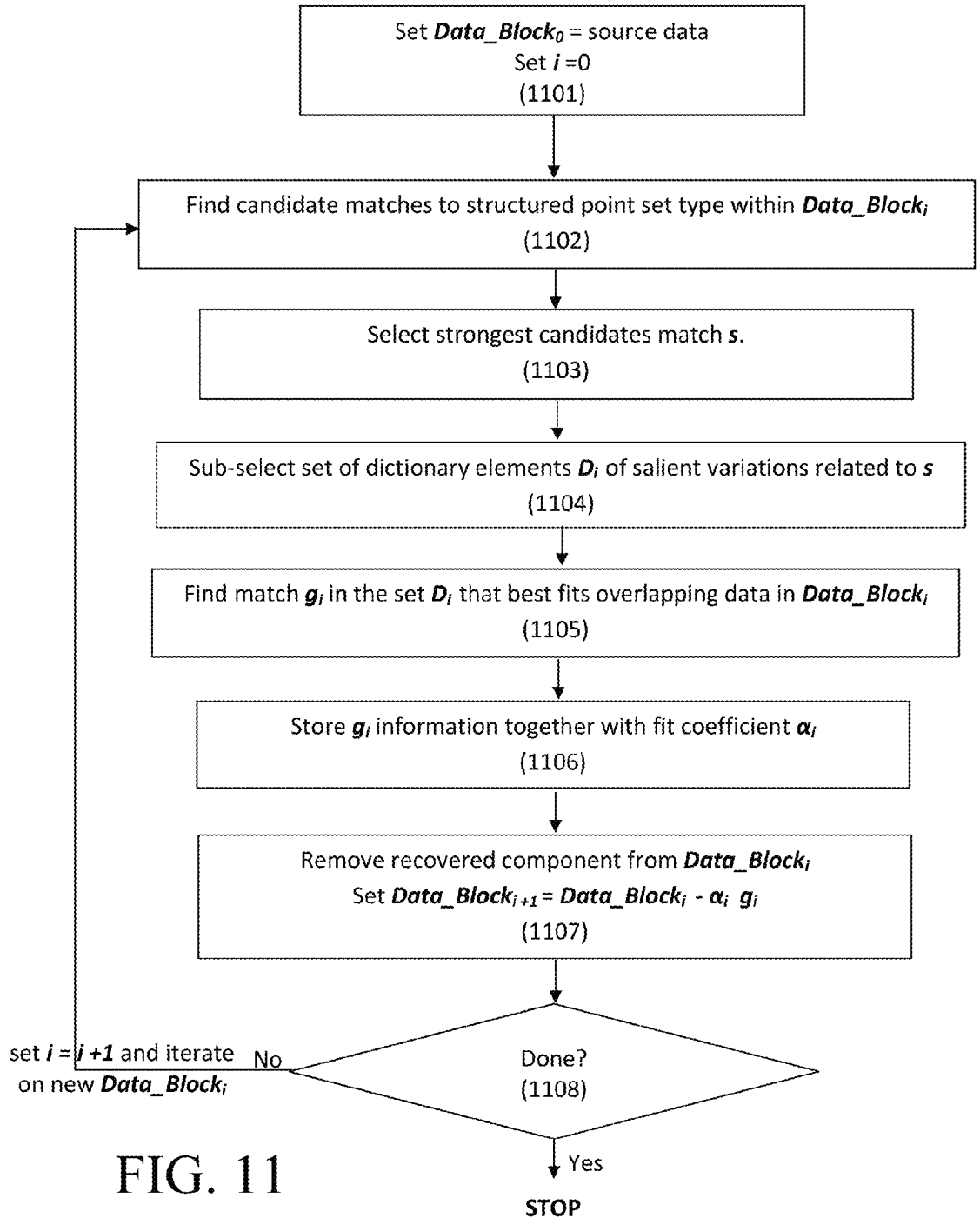
FIG. 11 is a flow diagram illustrating a general flow of processes for carrying out feature extraction guided sparse decomposition in one exemplary embodiment of the present invention.

FIG. 11 illustrates a general flow of processes for carrying out feature extraction guided sparse decomposition in one exemplary embodiment of the present invention. A source data block is established at stage 1101. Processing of images or other 2D arrangements of data are described herein; however, the subject system and method are not inherently limited to 2D data structures. Volumetric data or any higher dimensional data sets may be treated similarly, provided that corresponding measures are employed by which to identify candidate features within the target space. At stage 1102, candidate features are identified using such corresponding measures (e.g., a Hough transform in the exemplary embodiment disclosed.) The structured point set type of interest in the illustrated embodiment and applications comprises points mutually situated to describe line segments; however, using alternate measures such as a Generalized Hough transform, other type of structured point sets may be sought. At stage 1103, estimated candidates for a structured point set are reduced to a single match s. This may be via any suitable ranking method or in certain embodiments even by random choice. At stage 1104 a set of dictionary elements that best suit our candidate feature match s are sub-selected. These may be down-selected from a stored dictionary in certain embodiments, but are preferably generated on the fly according to the nature of the match s, by generating a prototype example and operating upon it with a predetermined selection of distortion operations.

At stage 1105, the specific atom that best fits the corresponding local data within the data block is then chosen from amongst the sub-dictionary atoms. This initial choice may be refined by further searching in certain embodiments. This optimum atom is then stored together with its degree of fit to the data block. Preferably, the atom is stored not in its entirety but by recording its parameters of generation, with the degree of fit being represented by a coefficient value. At stage 1107, this fit atom is removed from the data block under consideration by subtraction. Because it has been carefully fit to the existing data, this typically results in the removal of a close approximation of the actual underlying feature from the data block, while leaving the remainder of the field undisturbed. Stages 1102 through 1108 are then iteratively repeated, each time using the residue from the previous extraction (residual data block remaining after removal of the feature approximated during each iteration), until the given stopping criteria is/are met.

Figure 12:
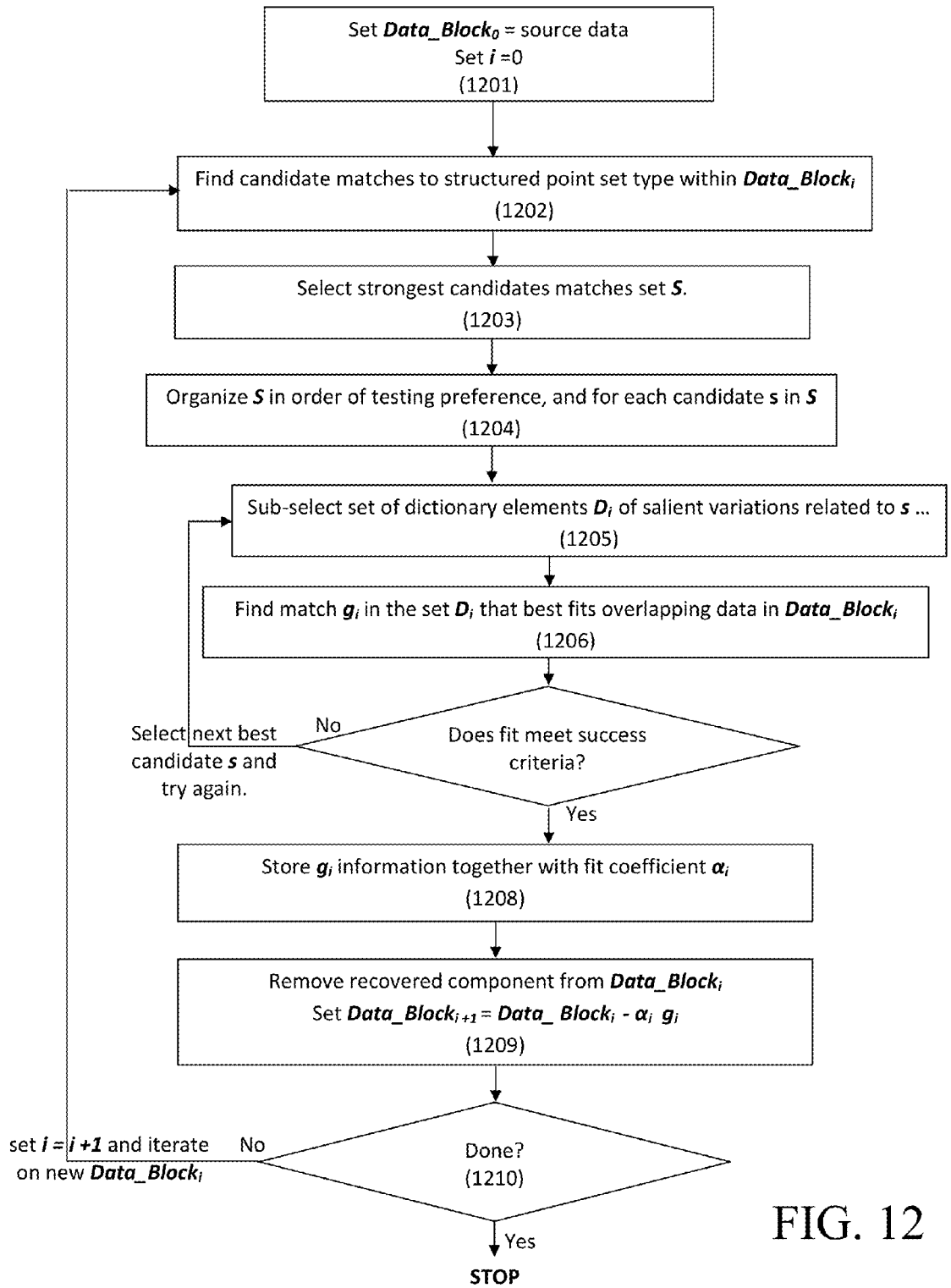
FIG. 12 is a flow diagram illustrating a general flow of processes for carrying out feature extraction guided sparse decomposition in another exemplary embodiment of the present invention.

FIG. 12 illustrates a general flow of processes for carrying out feature extraction guided sparse decomposition in another exemplary embodiment of the present invention. This embodiment enables an ordered search over competing candidate matches prior to the dictionary fit. It enables the discovery of multiple candidate matches then provides a mechanism for sub-selecting an operative choice. Addressing the differences from FIG. 11, at stage 1203 a set of candidates S is selected rather than just one candidate. In this process, for example, selecting a peak of a normalized Hough transform leads to a collection of equally viable line segments consistent with the peak. The viable line segments are organized (sorted) into an order of testing preference (1204). Each candidate s in S (stages 1205-1207) is then tested at stages 1104 and 1105. All the results may either be accumulated to pick a winner post facto or, as illustrated, be sequentially considered to choose the first tested candidate that meets the given acceptance criteria. The flow then proceeds much as in the embodiment of FIG. 11.

Note that after elimination of a best sparse fit from the residual images with respect to any particular candidate s in S, the flow may subsequently return to other members of S in future iterations. Thus, if multiple line segments consistent with the same or nearby Hough peaks are large enough to meet the acceptance criteria, they are picked up in subsequent iterations. This offers notable advantages in that by removing each feature sequentially, groups of faint, nearby, interfering, or overlapping features that would have been impossible to discriminate using a Hough transform directly, for instance, may be teased apart and reliably assessed.

DICTIONARY DEFINITION

The dictionary for the disclosed Hough transform guided GAD-type sparse decomposition preferably comprises a set of parameterized structured point sets that have orientation, inherent scale in each dimension of an analysis space, and a degree of distortion introduced by a modulating function. In the imaging application examples illustrated herein, the analysis space is preferably two dimensional and indexed by (x,y) spatial coordinate points. The modulation function is preferably chosen in view of the degree of physical distortion and the extent of focus and optical blooming that may be expected to occur in the given camera type sensor when operated over a particular range of lighting and noise conditions. In the illustrated example, convolution with a Gaussian function is used to blur point sets. The degree of distortion is defined by σ, which denotes the natural scale of a 2D circular Gaussian function. With a Gaussian functions parameterized by σ and $(x_0,y_0)$, that Gaussian function G(x,y) is expressed by the equation:

$$G(x, y) = \frac{1}{2\pi\sigma} e^{\left(\frac{-(x-x_0)^2+(y-y_0)^2}{2\sigma^2}\right)}$$

Using this parameterized function, a symmetric 2D Gaussian may be generated at any desired resolution, centered anywhere in the given space at coordinate point $(x_0, y_0)$. Convolving such a 2D Gaussian image with any defined image point set, it is well understood in the art that one will achieve the effect of blurring the point set. The degree of such blurring is determined by the parameter σ. It is also understood that by setting σ=0, one intends to take the limit of the Guassian (single point function), such that the convolution is the same as the original undistorted point set.

In the illustrated embodiments, a symmetric 2D Gaussian may be used, with a single blurring parameter. This should prove sufficient for many applications. In certain alternate embodiments, the modulation function may be replaced by other suitable windowing functions (many of which are known in the art) that will create other distortions in the fixed point set. In certain other embodiments, lens distortions, color shifts, and other effects may be included as additional parameters of the dictionary.

Generally, there are two ways to formulate a prototype dictionary in the illustrated embodiments. One is to consider a simplification of the blurring idea, and create directionally oriented 2-D Gaussians directly. This defines for all (x, y) within the image area atoms of the form:

$$g(x_0, y_0, \theta, \sigma_1, \sigma_2) = \frac{1}{2\pi\sigma_1\sigma_2} e^{-a(x-x_0)^2+b(x-x_0)(y-y_0)+c(y-y_0)^2}$$

where, $$a = \cos(\theta)^2 * \frac{1}{2\sigma_1^2} + \sin(\theta)^2 * \frac{1}{2\sigma_2^2}$$

$$b = -\sin(\theta)^2 * \frac{1}{4\sigma_1^2} + \sin(\theta)^2 * \frac{1}{4\sigma_2^2}$$

$$c = \sin(\theta)^2 * \frac{1}{2\sigma_1^2} + \cos(\theta)^2 * \frac{1}{2\sigma_2^2}$$

and θ defines the angle of orientation of the major axis, $\sigma_1$ the spread along the minor axis, and $\sigma_2$ the spread along the major axis.

Figure 16:
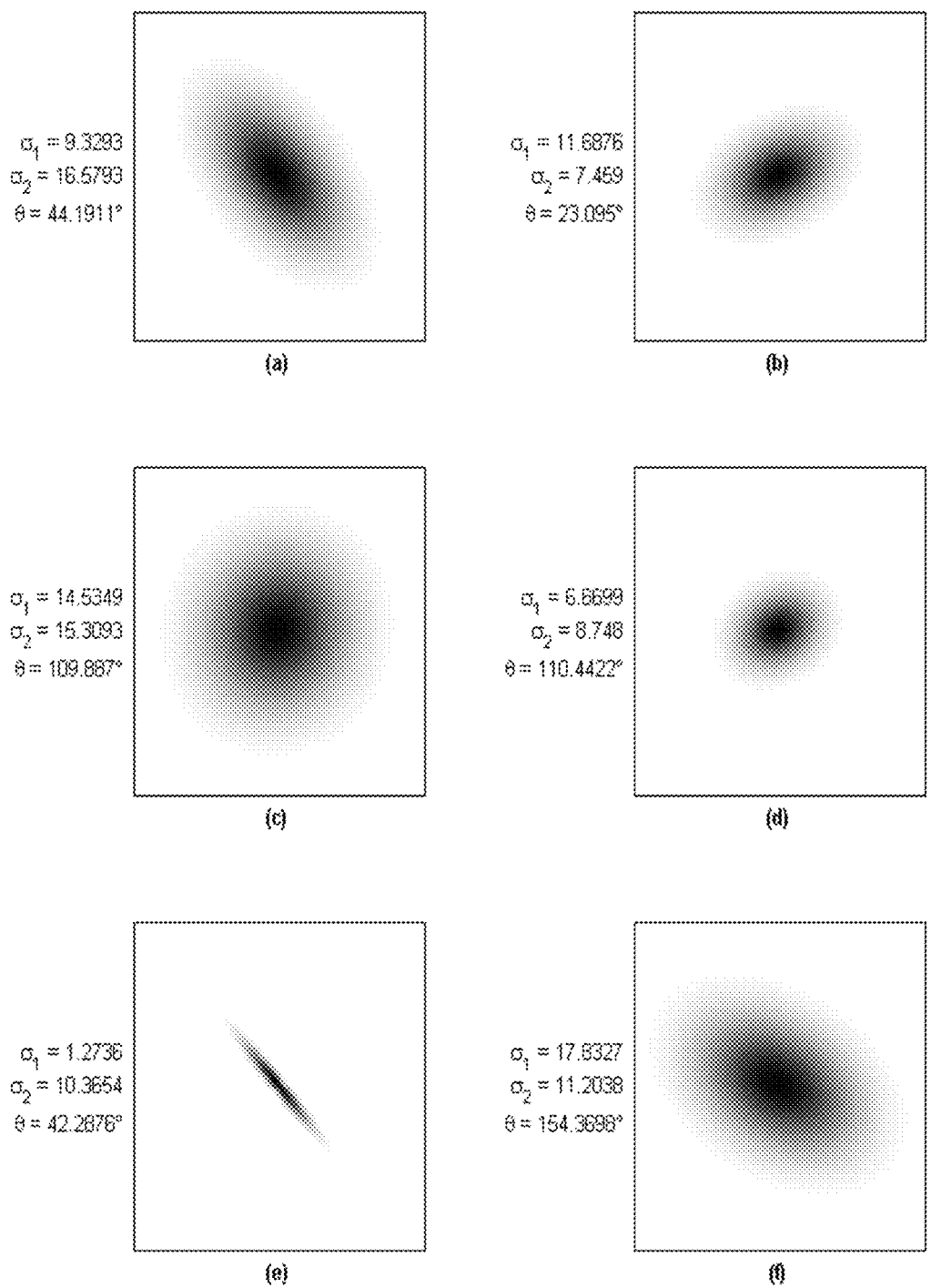
FIG. 16 is a set of graphic plots showing various examples of Gaussian atoms, as configured by a sampling of different parametric values; and, FIG. 17 is a set of graphic plots showing various examples of blurred line segment atoms, as configured by a sampling of different parametric values.

FIG. 16 shows various examples of such atoms, as configured by a sampling of different parametric values. Note that these atoms may range from line-like to point like patterns. These images have been plotted as black on white for visualization purposes, but may in various applications be used with inverse exposure, be applied to various color bands, and be extended into higher dimensions in those applications operating in higher dimensions.

A second, and preferred, way to formulate the dictionary is to generate connected (or mutually associated) point set objects and blur them by using the distortion described in preceding paragraphs. In the exemplary embodiments disclosed, D denotes a dictionary of Gaussian blurred line segments $g(x_0, y_0, x_1, y_1, \sigma, \delta) \in D$. In this formulation, the points $(x_0, y_0)$ and $(x_1, y_1)$ define the endpoints of a line segment and may represent any pair of pixels points (integer or continuous valued) within the image space $I_0$. The parameter σ denotes the sigma of a circularly symmetric Gaussian used to blur the line segment (see above), and the parameter δ denotes the maximum distance a pixel may be from the line to be considered part of the point set. Since a line segment is defined mathematically as infinitely thin, the maximum distance δ is, in effect, ½ of the width of the line segment point set that stretches between $(x_0, y_0)$ and $(x_1, y_1)$. With these parameters, a digital line segment (a specific structured set of points) may be generated at any resolution, width, and length within the working image space.

Graphically plotting a digital line segment of finite width is understood in the art. For example, one way of computing such digital line segment is to test every pixel in the target image space that satisfies the equation of the line, then set those pixels within a distance δ of the continuous line segment to a value of 1 and the remainder to 0. Other techniques for drawing a line of finite width within a bounding box are known. Essentially, a true/false mask may be created for a connected point set indicating whether each of the line's constituent pixels is positioned on the line segment or not (using 1 for true, and 0 for false). This becomes the root of the atom.

While described for a line segment, other structured point sets may be treated similarly. For example, one may replace straight line segments with segments of curved lines, or lines intersecting to define a corner. One may use instead circles, polygons, or other closed curves. One may use filled areas and volumes, or multi-part sets that have organized points separated by space. One may also use specific shapes, such as arrows or stars, or projections of real objects, such as air planes, or body organs. In each alternate embodiment, the underlying structured point set is used, parameterized by scale, orientation, and any distortions of relevance, to form a continuous space of possible un-blurred atoms. In preferred implementations, these alternative point sets (or patterns) are matched with suitably corresponding transforms particularly sensitive to their specific detection, such as a generalized Hough transform. The line segment example of the illustrated embodiments is illustrative as it addresses problems in which linear point sets predominate—such as in edge detection or orbital path detection.

Figure 17:
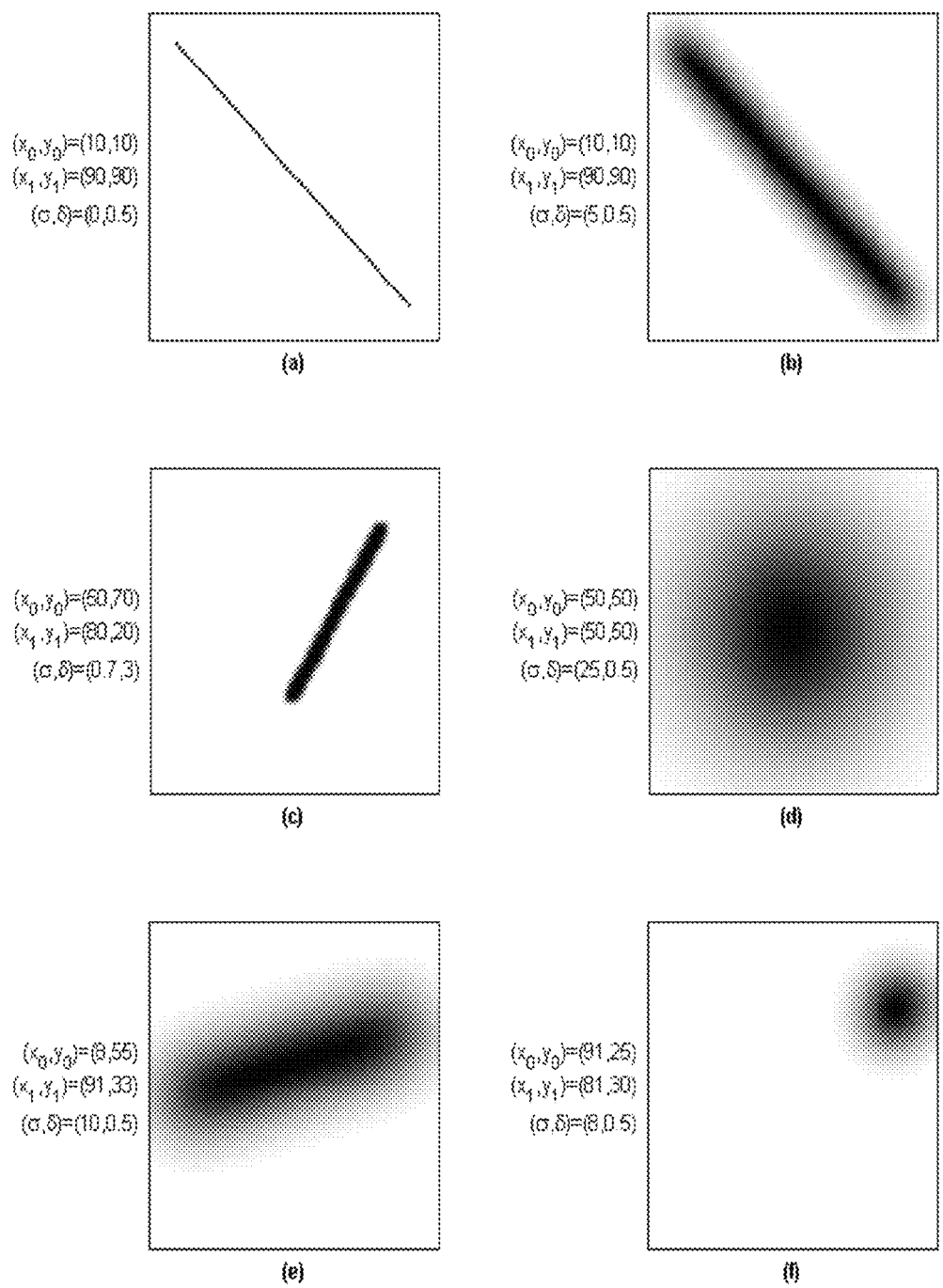

Having established a clean digital line segment, the atom is blurred using a convolution operation with a circular Gaussian of σ. (Equation above.) Finally, the atom is normalized by dividing each pixel by the square root of the sum of the squares of all pixel values. Thus, each possible atom $g(x_0, y_0, x_1, y_1, \sigma, \delta)$ essentially provides an image of a blurred line segment positioned in an image space of the same size as the test image space $I_0$. FIG. 17 illustrates examples of such blurred line segment atoms, as configured by a sampling of different parametric values. Note that the atoms may range from line segment-like to point-like in shape, and may be parametrically configured with any chosen degree of blur. This provides for an infinitely large dictionary of prototypes, where the atoms $g(x_0, y_0, x_1, y_1, \sigma, \delta) \in D$ are defined by the six continuously valued parameters. This dictionary is more conducive to close approximations to any circular or linear objects with constant width than the approximate dictionary defined by standard 2D oriented Gaussians $g(x_0, y_0, \theta, \sigma_1, \sigma_2)$ and discussed in connection with FIG. 16. Again, these atom images have been plotted as black on white for visualization purposes, but may in various applications be used as needed in the inverse exposure, be applied to various color bands, and be extended into higher dimensions in those applications operating in such higher dimensions.

1. Let $I_{thresh}$ be the Indicator Matrix where $I_{thresh}(x, y)=1 \langle I_i(x, y) > \mu(I_i) + k\sigma(I_i) \rangle$.

In this processing stage (within an iteration of execution), $I_{thresh}$ denotes a matrix of elements corresponding to the image data points of a given image frame $I_i$. The matrix element is preferably set to the binary value 1, where the corresponding image data point of $I_i$ is greater than the mean of $I_i$ plus a number (k) of standard deviations of $I_i$, and set to the binary value 0 elsewhere. In certain alternate embodiments, one may instead set $(\alpha(\mu/(I_0)+k\sigma(I_0))$ as a fixed threshold modulated by a parameter $\alpha$; however, because objects are being removed from $I_0$ at each iteration, the subsequent stepwise image $I_i$ will have less overall brightness and therefore fewer pixels above the threshold unless the threshold is adjusted for each step. The parameter k may be set by an operator to adjust operation to achieve smaller or larger point sets, and is application specific. A value of k=1 may be used, for example.

3. Normalize, Setting $$H = H - \frac{\max(H)}{\max(H_{ref})} H_{ref}$$

This processing stage is carried out to compensate for differences in the innate probability of certain structures appearing within the defined image space. For example, the relative number of ways in which one may draw a line-segment of certain length within a finite image region is limited. Within a rectangular m×n image space, for instance, there are only two possible line segments of maximum length—the two line segments extending between diagonally opposed corners. The normalization is preferably carried out so that the Hough transform output is re-weighted to reflect the occurrence of strong candidates of any size or orientation (in contrast to accepting the probability of these occurring to be by random chance). The most likely linear point set features are weighted for selection first. Other embodiments may change this weighting in order to emphasize different ordering of features discovery in the sparse approximation process. For computational convenience, certain other embodiments may further standardize the matrix H, setting H=round (H−min(H)), and thereby mapping it to a set integer values starting at a minimum of 0.

FIG. 7A illustrates the changes in relative values that occur in a Hough transform matrix used in one exemplary application from (a) before re-normalization to (b) after re-normalization. Each point in this two dimensional space represents an estimate of the accumulated likelihood that a line-like set of points exists within the original test image $I_{thresh}$. The vertical and horizontal axes represent $\rho$ and $\theta$ respectively, where $\theta$ denotes the angle of candidate lines and $\rho$ denotes the candidate lines' orthogonal distance from a fixed point in the image, typically the origin. Lines that correlate with each point are defined by the equation: $\rho = x \cos(\theta) + y \sin(\theta)$.

As noted herein, other structured point sets or patterns may be detected by the subject system and method. In those embodiments, suitable alternatives to the Hough transform which are configured or tuned to be sensitive to the point sets of interest are used for pre-screening the image data and guide the sparse approximation. Numerous line shapes and curves may be detected by use of the generalized Hough Transform, for example. Also known in the art are Radon transforms, Fourier transforms, wavelet transforms, matched filters, and others, each of which may be suitably configured by those skilled in the art to produce organized values that sensitive to the particular types of structures desired.

4. For the Peak in H, Estimate a Set S of Potential Contributing Line Segments in $I_{thresh}$ This processing stage is carried out to evaluate the normalized matrix H, and search for the single best peak. In alternate embodiments, on may choose to collect more than a single peak and thus increase the number of line segments to be considered jointly during the sparse approximation stages. In either case, a peak is identified by searching for a local maximum value greater than a threshold, typically established as $$\frac{1}{2} \cdot \max(H).$$

if more than one peak is sought, then it is done iteratively after suppressing a neighborhood around the first peak by setting those value in H to 0.

Once a peak is identified, it may be mapped back to a set of contributing line segments in the $I_{thresh}$ image. The mapping of points in the original image to Hough transform peaks proceeds by considering all points that satisfy the corresponding line equation for that peak (see above). These points are examined within the $I_{thresh}$ image, and those separated by less than a predetermined distance $l_{gap}$ are connected to construct a line segment. Once this process is complete, only those line segments longer in length than a predetermined value $l_{min}$ are retained as part of the set S.

5. Apply Gap Filling Algorithm to Each Estimated Segment in s to Satisfy Minimum Length Criteria $l_{min}$ In accordance with the exemplary embodiments disclosed, all candidate lines segments are recovered, starting preferably with a value of $l_{gap}=2$. If there are no lines meeting the criteria requiring a length longer than $l_{min}$, then $l_{gap}$ is incrementally increased until at least one line is found which does meet the minimum length $l_{min}$ requirement. Other courses of action may be implemented in alternate embodiments such as, for example, simply discarding the peak from further consideration and moving to the next peak.

6. Sort Segments in s by Length

This processing stages seeks to eliminate the "biggest" objects first. This is consistent with the greedy sparse approximation approach, which seeks to express the largest amount of observed data with the fewest number of components that meeting the applicable dictionary criteria. Alternative embodiments can choose other sorting criteria. For example, the segments may be sorted from the smallest object or objects within a certain size range, if salient to the detection problem of interest.

7.a. Define $D_i \subset D$ where Each $g_\gamma \in D_i$ is Consistent with the Candidate Segment s In this processing stage, a subset of the general dictionary D is selected which contains only those atoms having endpoints near the endpoints of the candidate segments in S. In the illustrated embodiments, this is preferably done by construction. The predetermine parameters $\Delta_x$ and $\Delta_y$ are applied to define a search space relative to the end points of the candidate segment s. Similarly, the predetermined parameters $\sigma_{max}$ and $\delta_{max}$ are applied to define a search space of sigma blurs and line widths. Thus all the atoms of the index dictionary $D_i$ $g(x_0, y_0, x_1, y_1, \sigma, \delta) \in D_i$ are those where $x_0 \in [x_{s0}-\Delta_x, x_{s0}+\Delta_x]$, $x_1 \in [x_{s1}-\Delta_x, x_{s1}+\Delta_x]$, $y_0 \in [y_{s0}-\Delta_y, y_{s0}+\Delta_y]$, $y_1 \in [y_{s1}-\Delta_y, y_{s1}+\Delta_y]$, $\sigma \in [0, \sigma_{max}]$, $\delta \in [0, \delta_{max}]$, and the Hough candidate line segment s goes from $(x_{s0}, y_{s0})$ to $(x_{s0}, y_{s0})$. This search space may be stepped through using any suitable means known in the art to generate and test the fit of each candidate within $D_i$. Note that since the general dictionary D is defined continuously, there other search methods known in the art which may be used to guide the finding of a local maximum in fit without defining a specific search space (e.g., bisection, secant methods, Newton's method, and the like). Such search methods be used in alternate embodiments.

7.b. Search for $g_i \in D_i$ Such that $|\langle g_i, I_i \rangle| = \sup_{g_\gamma \in D_i} |\langle g_i, I_i \rangle|$ In this processing stage, the atom $g_i$ is found within the index dictionary $D_i$ by computing the maximum magnitude inner product with the image. In the illustrated embodiment, the inner product is defined by the equation:

$$|\langle A, B \rangle| = |\Sigma_{i,j} A(i,j) \cdot B(i,j)|$$

where A represents the atom $g_i$ plotted in the same size image matrix as $I_i$, and B represents the matrix $I_i$, such that $(i, j)$ indexes the overlapping portions of data within these matrices.

For efficiency, this search is preferably approximated using two steps. First, a position search is carried out, then a $\sigma$ blurring search is carried out. Further, the line width parameter $\delta$ is fixed to match the set of parallel candidate lines that correspond with the Hough peak. These considerations may be relaxed in alternate embodiments; however, restricting the search space speeds practical computation. The initial position search considers all atoms within the index dictionary $D_i$ subsample over a predetermined grid of coordinates within the delta ranges. For this search, the parameter $\delta$ is fixed to $\sigma=1$, in order to consider only slightly blurred line segments. Once a candidate is found in that search range, the end point choices are fixed and the search refined by testing values of $\sigma$ between zero and $\sigma_{max}$. In certain embodiments, an additional step is applied in which the fixed step search grid is refined to finer steps in order to resolve the atom that satisfies the following condition:

$$|\langle g_i, I_i \rangle| = \sup_{g_\gamma \in D_i} |\langle g_i, I_i \rangle|$$

However, it is sufficient in certain other embodiments to settle for a quasi-optimal fit as a tradeoff for computational speed. In addition, certain embodiments may employ a Gaussian distortion function realized on only a small k×k window of points rather than on the full image space so that the convolution may be computed faster.

7.c. If $|\langle g_i, I_i \rangle| > \epsilon$ Exit, Else Consider Next Candidate In this processing stage, if the best match as judged by the absolute value of the inner product is below the preselected parameter $\epsilon$, a different candidate segment is considered, and processing stages 7.a-7.c are repeated therefor. If no candidate is found satisfying this condition within the set S, the next course of action depends upon the particular requirements of the given application. In certain applications, for instance, this may be considered a stopping condition. In other embodiments, the processing stages may be repeated with respect to the next largest peak in the normalized Hough transform, with the stopping condition deferred until all Hough peaks have been so tested.

8. Set $I_{i+1} = I_i - \langle g_i, I_i \rangle \cdot g_i$

In this processing stage, the projection of the biggest atom $g_i$ on the current iteration's image residual $I_i$ is subtracted from that image residual $I_i$, and the resulting image residual $I_{i+1}$ is used for the next step/iteration as that iteration's image residual $I_i$. The matrix $I_i$ is referred to as the "residual" (or alternatively "residue"), since it corresponds to the previous image minus features that have just been identified. Preferably, the value $\langle g_i, I_i \rangle$ is collected and stored at each step i, along with the parameters of the atom $g_i = g(x^i_0, y^i_0, x^i_1, y^i_1, \sigma^i, \delta^i)$ derived for that step/iteration. Together, they form the set of parameters sufficient to fully recreate the atom. However, in alternate embodiments, the digital realization of the atom itself may be recorded.

The decomposition of $I_0$ may be reversed, and the stored information used to reconstruct the original image or an approximation thereto. After the $i^{th}$ step the image may be described as a sum of sparse components:

$$I_0 = \Sigma_{i=1}^n \alpha_i \cdot g_i + R_n$$

where $R_n = I_{n+1}$, or the nth residue, and $\alpha_i = \langle g_i, I_i \rangle$, or the $i^{th}$ coefficient as measured by the inner product. Thus, even if only a subset of the atoms desired were collected over iterative execution that is prematurely cut off after k iterations (that is, after a sequence of k decomposition steps), the following approximation:

$$\tilde{I}_0 = \Sigma_{i=1}^k \alpha_i \cdot g_i$$

will produce an image which still resembles the original image but contain only those components that were selected during steps 1 through k. This property may be applied to suppress noise, based upon the likelihood that noise will not be similar to the desired type of point set feature (e.g. line segments) and therefore not selected until all of the preferred features have already been removed. This property may be employed to find and enhance features of interest as in examples described in following paragraphs, and may also be employed as part of a compression algorithm, leveraging the likelihood that the number of parameters used in reconstructing $\tilde{I}_0$ is less than the total number of original image data points in the image $I_0$. One may also incorporate further compression concepts into the application of sparse approximation in accordance with the disclosed embodiments.

Each of the atoms $g_i$ may be evaluated alone or in combination with others as a candidate feature consistent with the desired point set structure in a particular application. Such feature is conveniently parameterized for further exploration and analysis, an advantage favorably exploited in the orbital tracking example described in following paragraphs.

In order to examine faint features for close inspection, one may reconstruct a related approximate image with uniformly weighted coefficients. Consider the approximation:

$$\tilde{\tilde{I}}_0 = \sum_{i \in \zeta} \beta \cdot g_i$$

where all coefficients are set to a fixed value $\beta$ and summed for all atoms selected in a sequence of steps, that is steps i in the set $\zeta$. Each selected atom is displayed in its same physical location in the original image, but at an intensity value that makes it equally visible with the other selected peers. This concept is also reflected in the examples described in following paragraphs.

Simultaneous Configuration for Decomposition

In certain alternate embodiments a simultaneous version of the Feature Extraction Guided Sparse Decomposition operates on a grouped set of images (rather than just one image), which are at least roughly aligned in relationship to each other in a way that tiles a certain original physical space. Accordingly, paths occurring in overlapping images in a stack tend to be approximately co-registered, while paths occurring in neighboring images tend to be approximately coherent from image to image. This occurs "approximately" in each case, since the decomposition includes a corrective search over projected subspaces for each atom in each image that will correct to find the best match. The decomposition may thus be used to achieve fine alignment of images where only course registration is available.

The decomposition proceeds to carry out the processing stages 1-6 (much as described in connection with the non-simultaneous configuration on a single image in preceding paragraphs) for each $j^{th}$ image $I_i^j(x, y)$. The decomposition then either (a) finds a joint maxima over the set of normalized Hough Transforms $H^j$ by taking a p-norm of the point-wise matrix terms over the j dimension and creating lines from the joint maxima; or, (b) sorts and considers each line segment in each $H^j$ taking the longest in sort order for the sequential tests in the processing stages of step 7, wherein the joint p-norm is evaluated over the $j^{th}$ dimension of the inner products $|\langle g_i^j, I_i \rangle|$. A jointly (or simultaneously) preferred best 2D Gaussian atom for the fit is thereby chosen. Again, as described in [1], [2], the decomposition proceeds to set the residual image for the next iteration i+1 to be $I_{i+1}^j = I_i^j - \langle g_i, I_i^j \rangle g_i$, using the respective best fits atoms for each image in the stack.

Consider a stack of images collected in known correlation with each other (as shown in FIG. 1B which illustrates certain scenarios in connection with one example application for orbit estimation). For example, one may collect multiple images of the same scene, within close time proximity of one another in the hope that different images collected with the same sensor will exhibit different noise features. One may alternatively collect multiple images of the same scene in different color bands, such as Red, Green, and Blue, or even in hundreds of hyper-spectral bands. One may likewise capture multi-angle images taken at known angles relative to one another so that the portions of the images which overlap may be deduced. As a further example, one may capture multiple timed images, in which the images are captured in a time delayed fashion. The time delay may be approximately synchronized with an event of interest such as the motion of a machine or the passing of a satellite orbit.

Because the decomposition may operate to recover jitter within its search ranges, the images in all cases need only be approximately aligned by predetermined means. The subject system and method are applied in certain embodiments so that they discover minor misalignments, with their outputs being iteratively employed to improve subsequent alignments. For example, one may estimate the orbit of a satellite from its track and iteratively improve this estimation as new images in the sequence are acquired in each pass.

One may also consider a stack of multiple images that are acquired for purposes of finding commonalities. That is, for the purpose of establishing what elements consistently occur within the images. This may be applied, for example, in determining a signature set of features corresponding to a particular event or scene, which features may be subsequently applied in machine learning scenarios. One may also consider a stack of multiple images acquired for the purpose of finding differences or for finding specific anomalous images within the stack.

Regardless of the application, a simultaneous version of the feature extraction guided sparse decomposition disclosed herein proceeds as follows. The acquired images are first adjusted to be approximately aligned according to their predetermined aspects and placed into a uniformly sized stack of image spaces $^jI_0$, were the images in the stack are indexed by $j$ in the range 1 to m (there being m total images in the stack). (In the notation used herein, the preceding superscript j enumerates the number of the image in a stack associated with the data and the following subscript i enumerates the iteration step in the sequence of iterative decomposition executions. This superscript in certain figures may likewise appear after the item referenced, (e.g., Data_Block$^j_i$), which is equivalent notation indicating the same relationships. The one exception to this notational convention is in the context of the p-norm, reference below. Such superscripts do not indicate exponents.)

Simultaneous Configuration Embodiment 1

More specifically, in one exemplary embodiment, the iteration index is initialized i=0, and for each iteration step of execution, the decomposition proceeds as follows. For each $j^{th}$ image in a collection of m images, operate independently on each image frame $^jI_i$ of the collection, with the following processing stages 1-3:
  1. Let $^jI_{thresh}$ be the indicator matrix where $^jI_{thresh}(x, y) = 1 \leftrightarrow {^jI_i}(x, y) > \mu(^jI_0) + k\sigma(^jI_0)$.
  2. Find $^jH = \text{Hough}(^jI_{thresh})$.
  3. Normalize, setting $$^jH = {^jH} - \frac{\max(^jH)}{\max(H_{ref})} H_{ref}.$$

Next, jointly consider the resulting normalized Hough transforms of the collection of m images to determine the Hough peak that will serve as a basis for the search space. Form a matrix H where, for a predetermined value of p, each element is defined by:

$$H(x, y) = \left( \sum_{j=1}^{m} |^jH(x, y)|^p \right)^{\frac{1}{p}}$$

This defines an element-wise p-norm over the set of Hough normalized transforms for the image collection. With p=1, for example, this forms a 1-norm or "city block" norm, with p=2 this forms a 2-norm or "Euclidian norm", etc. The p-norm has well understood extensions to p=0 and p=∞, which may also be applied. Alternative embodiments may use any other norm or cost function which reduces the set of j points to a single scalar-valued figure of merit. The generalized steps then continue as follows:
  4. For the peak in H, estimate a set S of potential contributing line segments in each $^jI_{thresh}$, for each j, applying the gap filling algorithm to each estimated segment in S to satisfy minimum segment length criteria $l_{min}$ as previously described.
  5. Sort segments in S by length.
  6. For each candidate segment s∈S
      a. Define $D_i \subset D$ where each $g_\gamma \in D_i$ is consistent with the candidate segment s.
      b. For each j, search for $^jg_i \in D_i$, such that $|\langle ^jg_i, {^jI_i} \rangle| = \sup_{g_\gamma \in D_i} |\langle g_\gamma, {^jI_i} \rangle|$.
      c. If $\max_{j \in [1 \ldots m]} |\langle ^jg_i, {^jI_i} \rangle| > \epsilon$ exit, else consider next candidate.
      d. if no candidate found, then stop.
  7. Set $^jI_{i+1} = {^jI_i} - \langle ^jg_i, {^jI_i} \rangle \, ^jg_i$, for each j∈[1 . . . m]
  8. Set i=i+1 and iterate until stopping criteria are met.

The details of the searching procedure in various simultaneous configuration embodiments are the same as in the single image configuration. However, in the simultaneous configuration, the search occurs for an individually optimized fit for each $^jI_i$ starting from the common seed atom that was determined in stage 4. Again, the values at each stage are preferably stored, in this case recording one value resulting for each of the m image segments in the stack. Thus, $\langle \langle ^jg_i, ^jI_i \rangle \rangle$ at each step i is preferably stored, along with the parameters of the atom $g_i=g(^jx^i_0,^jy^i_0,^jx^i_1,^jy^i_1,^j\sigma^j,^j\sigma^j)$, since this set of parameters is sufficient to fully recreate the atom. However, in alternate embodiments, the digital realization of the atom itself may be recorded.

One may implement alternate embodiments of this procedure to find a jointly common single element $g_i \in D_i$, for all of the image segments by considering a p-norm across the set of values $|\langle ^jg_i, ^jI_i \rangle|$ and choosing its supremum (i.e., maximum.) However, this alternative tends to suffer from certain instabilities and is therefore not preferred.

As before, the decompositions may be reversed, and the information stored used to reconstruct the original image or an approximation thereto. After the $i^{th}$ iterative step the image may be described as a sum of sparse components:

$$^jI_0 = \sum_{i=1}^{n} {}^j\alpha_i \cdot {}^jg_i + {}^jR_n$$

where $^jR_n$ denotes the nth residue, and $^j\alpha_i = \langle ^jg_i, ^jI_i \rangle$. Reconstruction of approximations, as well as the analyses and applications are consistent with the single image case. Note that the atoms $^jg_i$ for the stack of m images form an equivalence class of atoms determined to be similar and linked by the computational process. Essentially, a simultaneously sparse approximation of the stack of images is achieved using this common set of similar atoms. Here, "simultaneous" means they share the same decomposition space in a manner that is jointly optimal rather than optimal to just one individual image in the stack.

Figure 13:
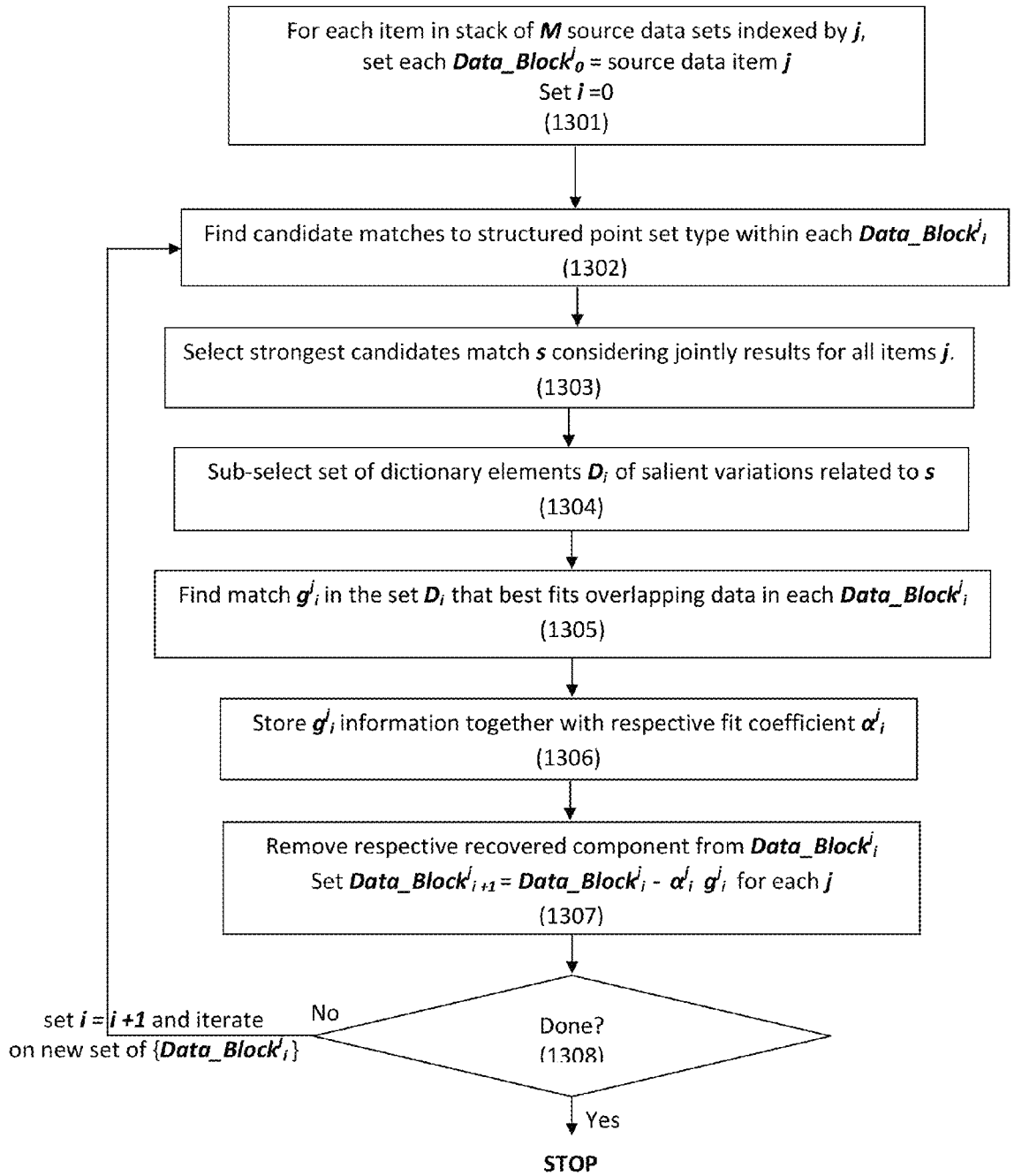
FIG. 13 is a flow diagram illustrating a general flow of processes for carrying out feature extraction guided sparse decomposition in yet another exemplary embodiment of the present invention.

FIG. 13 illustrates a general flow of processes for carrying out feature extraction guided sparse decomposition in an alternate embodiment of the present invention similar to the embodiment of FIG. 11, but configured to accommodate joint treatment of multiple source data blocks in a stack. Again, the embodiment is described without reference specifically to images or to linear point sets, since they are application-specific aspects to which the present invention is not limited. Noting the differences from the embodiment of FIG. 11, at stage 1301 a collection of data blocks are assigned, indexed as described in preceding paragraphs with reference to their source in the $j^{th}$ item from the set. Stage 1302 serves to find point set matches in each working data block, and at stage 1303 the strongest candidate s is selected by considering the results jointly. This may be effected with a p-norm function as in the described herein, or by other means to achieve a definitive selection.

The flow continues with the creation of a sub dictionary as in the embodiment of FIG. 11. However, at stage 1305 individual best fits are made to each of the working data blocks, thus optimizing the fit to each. The information for each is then stored at stage 1306, this time including one set of values for each data block under simultaneous consideration. Finally, at stage 1307 each stepwise fit atom is removed, as in the embodiment of FIG. 11, but respectively for each of the data blocks. This execution is iterated with consecutive residual groups of data blocks until the given stopping criteria are met. The embodiment of FIG. 12 may be similarly generalized to enable consecutive testing of multiple "best" candidate feature, once a set S of candidates has been collected, as described in preceding paragraphs.

Figure 15:
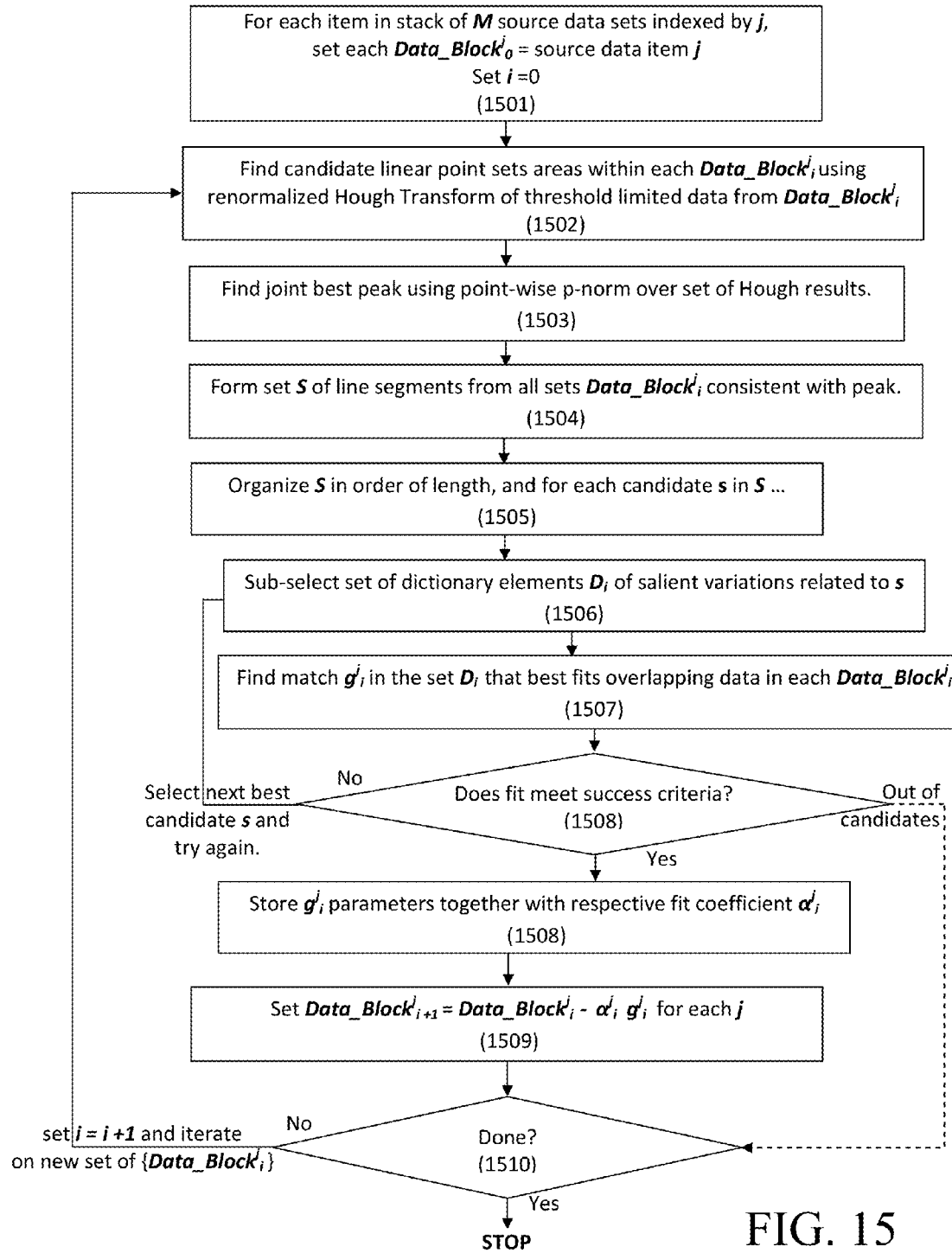
FIG. 15 is a flow diagram illustrating a general flow of processes for carrying out feature extraction guided sparse decomposition in a further exemplary embodiment of the present invention.

FIG. 15 illustrates a general flow of processes for carrying out feature extraction guided sparse decomposition in still another alternate embodiment of the present invention directed more specifically toward the discovery of linear point sets in one or more images. This embodiment may be configured to accommodate both the single image and simultaneous image stack cases addressed above. If the number of images in a stack is 1, the parameters M=1 and j=1, and all simultaneous operations as described reduce to that described for the single image case without modification. Stage 1502 reflects a specific implementation of linear point sets discovered using the renormalized Hough Transform. Stage 1503 then reflects computation of a joint best peak, taken with respect to a p-norm over the set of results. Stage 1504 reflects the collection of candidate line segments from each of the set of image residuals in the stack.

At stage 1506, a sub dictionary is generated on the fly, such that its members are "sub-selected' by assessing the salient range of parameters over which adjustment of the candidate line segment end points, line widths, and blurring distortions are enacted. A search is made over this space, only realizing actual atoms to the extent necessary to satisfy the conditions of stage 1507. The additional dotted arrow extending from stage 1508 provides for termination of the search loop should no candidate satisfy the success criteria. As described in preceding paragraphs, since the success criteria is realized in the disclosed embodiments as a test on the magnitude of an inner product, the inability to find any further satisfactory atom generally indicates that all of the matching features in the image data have been found and recorded. The remainder of the loop proceeds as previous described in connection with the preceding embodiments.

Simultaneous Configuration Embodiment 2

An alternate embodiment of a simultaneously configured decomposition diverges from the preceding embodiment 1 in one respect. Rather than taking a p-norm across the set of normalized Hough transforms $^jH$, $j \in [1 \ldots m]$ of the collection of m images, separate peaks are found in each $^jH$, as in the single image configuration. The set of candidate line segments found for each are then concatenated, $S = \cup_{j \in [1 \ldots m]} {}^jS$, sorted, and individually evaluated pursuant to stage 6. In a further alternate embodiment, the search may be for each individual $^jH$ peak in each $^kI_{thresh}$, in order to form an even larger set of candidates S.

The important shared aspect of these alternate embodiments is that they produce simultaneous sparse approximations to a set of quasi-aligned images by identifying structured features (e.g. linear point sets) that are strongly represented among them. The selected features will tend to reflect not only those that are very strong in one individual image, but also those that appear even weakly across a number of images in the stack. This latter property may be exploited to find extremely faint structures that might otherwise be impossible to identify in any one image, yet are common to both of them. Both hidden feature finding and noise suppression are greatly augmented by operating in this mode, by exploiting the joint information available in the simultaneously considered images. Moreover, variations in the details of the common feature are accommodated by virtue of the individually optimized search stage. In fact, the parameters that result from this search may be used to directly analyze the differences among the images in the stack; for example, to discover slight shifts in position, size, or distortion from one image to another.

Figure 14:
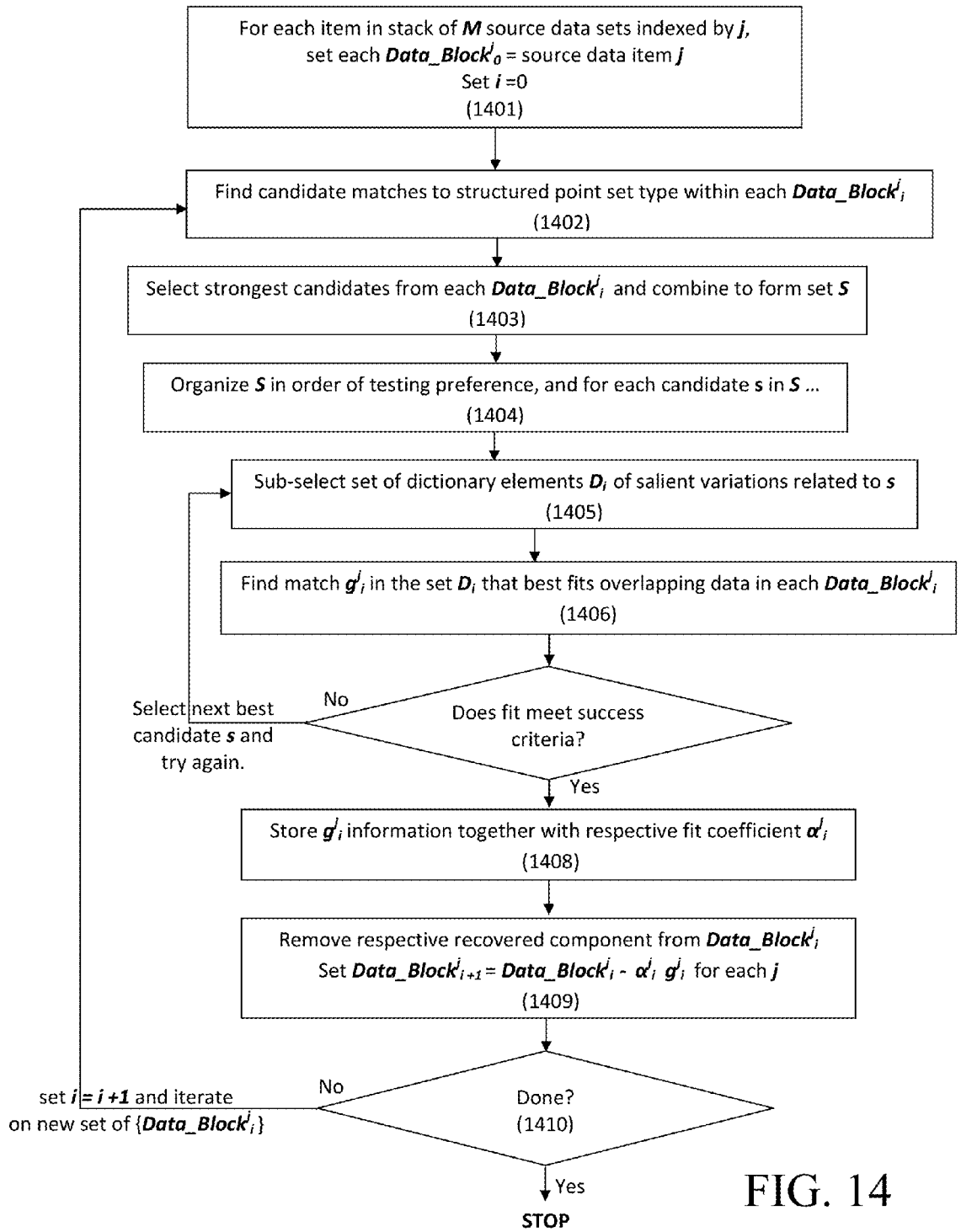
FIG. 14 is a flow diagram illustrating a general flow of processes for carrying out feature extraction guided sparse decomposition in still another exemplary embodiment of the present invention.

FIG. 14 illustrates a flow chart this alternative means of treating multiple source data items. Notice that block 1403 takes the union of possible line segments from each individual peak in each individual data block, as described above. This relieves us of the need to operate with a p-norm, but potentially increases the size of the candidate set S. As with other methods, we note that after elimination of the sparse fits with respect to any particular candidate s in S, the algorithm may subsequently return to other members of S in future iterations.

Possible Stacked Data Types

As described herein, the decomposition may operate on time-sequential image exposures, time or space aligned image exposures, of simultaneous multi-camera exposures, or on multi- or hyper-spectral data. Multi- and hyper-spectral images comprise images recorded with a filtering system that permits measurements of amplitudes of a comparatively large number of wavelengths. Where typical imaging systems (e.g. a digital camera) record intensity at three or four bands (e.g. red, green, and blue), multi-spectral systems record intensity at other additional bands, such as near IR, or finer gradations of color. So-called hyper-spectral systems further divide the light and IR spectrum into very fine steps and record intensities in sometimes 100's of color bands. Related systems may include additional capabilities to measure intensity at wavelengths outside the visual range, including near and far IR, UV, x-ray, or the like. The net result is that in each of these systems, each (x, y) pixel location in the image records a vector of intensities. The resulting dataset is often referred to as a hypercube or data cube. By fixing a point (x, y) and examining its pixel data, one is in effect examining the frequency spectra of the pixel as sampled at the predefined bands of the system.

Data is described herein as images without limitation, to apply to any 2D structure of data to be operated upon, optionally organized into 3D stacks. Higher dimensions of data may also be operated upon in alternate embodiments, with suitable measures implemented to accordingly modify the dictionary space and the Hough transform configuration.

Application Example

The LEO Problem and Sample Cases

Referring to FIG. 713, there is shown a schematic diagram illustrating the intercoupling of functional units in one exemplary embodiment of the present invention as applied to an LEO detection and tracking system. As shown, the detection and tracking system 700 includes a decomposition subsystem 710 programmably configured to carry out the feature extraction guided sparse decomposition disclosed herein. Depending on the particular requirements of the intended application, the decomposition subsystem 710 may be suitably configured to operate on a single image 702, on a stack of sequentially captured images 704 containing substantially the same object(s), or on a stack of independently captured images 706 respectively containing different objects to be mapped to a composite view/image.

The decomposition subsystem 710 is generally equipped with a reference unit that establishes a general dictionary of 2D atoms preferably comprising oriented line segments that are distorted by convolution with a Gaussian function and defined parametrically in accordance with the dictionary definition processes described herein. The subsystem 710 is also equipped with a candidate detection unit that pre-screens the image exposure(s) to identify therein at least one candidate grouping of image data points collectively indicative of a linear track of the object. A sparse approximation unit is coupled to the candidate detection unit and the reference unit, which sparse approximation unit computes for each candidate grouping an optimal atom. The sparse approximation unit projects the optimal atom of each candidate grouping onto a corresponding portion of the image defined thereby. Each projected portion is extracted from the image to leave a residual image. The subsystem 710 further comprises, preferably, a reconstruction or other storage unit coupled to the sparse approximation unit, which collects each extracted portion of the image generated upon iterative execution of the candidate detection and sparse approximation units. During the iterative execution, the residual image of each iteration serves as the image for the immediately succeeding iteration. The reconstruction unit combines the extracted portions of the image collected over a predetermined number of iterative executions in forming a reconstructed image containing the linear spatial pattern indicative of an object's track. For the particular application illustrated, the decomposition unit employs a Hough transform-based pre-screening to estimate the candidate object/orbit groupings (as indicated by the embodiment-specific designation GHAT, or Greedy Adaptive Hough Transformation based sparse decomposition).

System 700 further includes an LEO detection and Orbit Estimation units coupled as shown to the decomposition subsystem 710. These units 720, 730 carry out suitable post-processing to resolve the object's track found by subsystem 710 and configure the same as needed for reporting by a detection and track reporting unit 740. An orbit estimate refinement scheduling unit operates preferably in this application to update the object/orbit information imaged and maintained by system 700.

For practical purposes, an LEO survey telescope is assumed to operate in a staring mode, either fixed relative to the stars or relative to earth. It is assumed that in this staring mode, the telescope is used to acquire either a time-integrated image, or a series of discrete images that can either be fused together in post processing or considered jointly by our algorithm. In each image a small slice of sky is examined, as dictated by the field-of-view (FOV) of the telescope and given CCD sensor combination. Defining LEO objects as those in orbits ranging from about 200 km to 2000 km, apparent motion is assumed consistent with roughly 90 minute orbits. Aggregate imagery is collected over a period of time sufficient for an unknown LEO object to make orbital progress through some or all of the FOV.

Under these assumed conditions, an LEO object will trace a path through some portion of the FOV over one or more sample images. However, for a small object (e.g., <10 cm), pixel brightness along this path may be at or near the image noise floor. It is further assumed in this illustrative application that imaging is carried out electronically, during a period of time when the sun is between 12° and 18° below the horizon; therefore, the dominant noise floor is due to background sky brightness of between a magnitude 19.5 and 21 ($m_v$/arcsec$^2$). Such a path might be just visible to a careful human analyst looking at the right time in the right spot in recorded sensor data, but is extremely difficult for a computer to detect automatically while maintaining a reasonable false alarm rate.

Test Data

In one illustrative test case, the data was generated with certain constraints set as to the telescope design and observing environment. Data was emulated as arising from a telescope with a fixed position relative to background stars, assuming an optical system with an f/1.2, a net telescope transmittance of $\tau=0.6$, atmospheric transmittance of $\tau_{atm}$=0.75, CCD quantum efficiency of QE=0.7, a pixel pitch of x=12 μm, read noise of $e_n$=0 e⁻, and an aperture diameter of D=0.2 m.

A working image as defined to be of only n=128 pixels along a side. This would correspond to a small patch of an actual CCD image, but permits examples visible for purposes of explanation. A calculated pixel instantaneous field of view (FOV) was set to:

$$\mu = \frac{x}{f} = \frac{x}{f/\#\cdot D} = 0.18 \text{ arcsec}$$

Background noise was set to a magnitude of 20 $m_v$/arcsec² to emulate sky brightness when the sun is positioned approximately 18° below the horizon, and to a magnitude of 19.5 $m_v$/arcsec² to emulate sky brightness when the sun is positioned approximately 12° below the horizon. The magnitude was converted to luminosity, which was in turn converted to a background electron count, as follows:

$$L_B(m) = 5.6\cdot 10^{10}\cdot 10^{-0.4\cdot m}\cdot \left(\frac{180}{\pi}\right)^2\cdot 3600^2$$

$$e_B(m) = QE\cdot \tau\cdot A\cdot \mu^2\cdot L_B(m)\cdot t$$

where m denotes the visual magnitude per square arc second, and t denotes the total integration time of the image. A field of randomly chosen values was created from a Poisson distribution and resealed to set the RMS energy from the Poisson field to be equivalent to the RMS energy of a flat field of the calculated background electron count.

In the first sample case, image data points describing 10 stars were additionally inserted in the image at random (uniform distribution) locations, with random visual magnitudes M between 10 and 13. This was to simulate a sky region with stars normally invisible to the naked eye. The Airy Pattern of each star was modeled as a Gaussian with σ dependent on the star's magnitude, as follows:

$$L_s(m) = 5.6\cdot 10^{10}\cdot 10^{-0.4\cdot m}$$

$$e_s(m) = QE\cdot \tau\cdot A\cdot \tau_{atm}\cdot L_s(m)\cdot t$$

$$\sigma(m) = 1 + \frac{5}{m_{rng}}\log_{10}(m_{max} - m + 1)$$

where m denotes the visual magnitude of the star, t denotes the total integration time of the image, $m_{rng}$ denotes the total range of magnitudes, and $m_{max}$ denotes the actual maximum star magnitude.

Results for various sample cases demonstrating the efficacy of the feature extraction guided sparse decomposition disclosed herein are illustrated respectively for various scenarios and conditions in FIGS. 8A-8B, 9A-9B, and 10A-10C. These FIGS. show graphic plots of various night sky images. For clarity of illustration, these FIGS. are each accompanied by respective inverse exposure plots of the same shown in FIGS. 8C-8D, 9A-1, 9B-1, 10A-1, 10B-1, and 10C-1. These inverse exposure plots are identical to the original white-on-black plots, and included here in the interests of preserving clarity of description, should details of the original black-on-white plots be obscured when the FIGS. are reproduced.

Sample Case 1. Three Simulated LEO Objects in Short Tracks

Three LEO objects were simulated with diameters 10 cm (object 1), 9 cm (object 2), and 8 cm (object 3) all at an orbital distance of 1000 km, with solar phase angles of 90° and reflectance of 0.2 (half of which is specular reflectance and half diffuse). Object 1 was moved from the (x,y) points (10, 10) to (50,20); object 2 was moved from points (30,50) to (10,30), and, object 3 was moved from points (50,60) to (10,50). Using a fixed exposure time, the magnitude, luminosity, and electron count of each object was calculated in proportion to the stars and background, as follows:

$$P_{diff}(\psi) = \frac{2}{3\pi}\left(\sin\left(\psi\cdot\frac{\pi}{180}\right) + \left(\pi - \psi\cdot\frac{\pi}{180}\right)\cos\left(\psi\cdot\frac{\pi}{180}\right)\right)$$

$$m_{obj}(d, R, \psi, \rho) = m_{Sun} - 2.5\log_{10}\left(\left(\frac{d\cdot 10^{-5}}{R}\right)^2\cdot\left(\frac{\rho}{8} + \frac{\rho}{2}\cdot P_{diff}(\psi)\right)\right)$$

$$L_{obj}(m_{obj}) = 5.6\cdot 10^{10}\cdot 10^{-0.4\cdot m_{obj}}$$

$$e_{obj}(m_{obj}, t_{obj}) = QE\cdot \tau\cdot A\cdot \tau_{atm}\cdot L_{obj}(m_{obj})\cdot t_{obj}$$

where ψ denotes the solar phase angle in degrees, $P_{diff}(\psi)$ denotes the diffuse solar phase angle function, $M_{obj}$ denotes the magnitude of the object, d denotes the diameter of the object in cm, R denotes the range to the object (orbital radius) in km, ρ denotes the reflectance (half specular and half diffuse), $m_{Sun}$ denotes the magnitude of the sun (−26.73), $L_{obj}$ denotes the luminosity of the object, $e_{obj}$ denotes the number of electrons in a single pixel for the object, and $t_{obj}$ denotes the amount of time (in seconds) that the object stays in a single pixel (total integration time divided by path length). Lines were drawn and blurred with an energy-conserving Gaussian convolution to simulate optical diffusion along the line of sight.

Figure 9A:
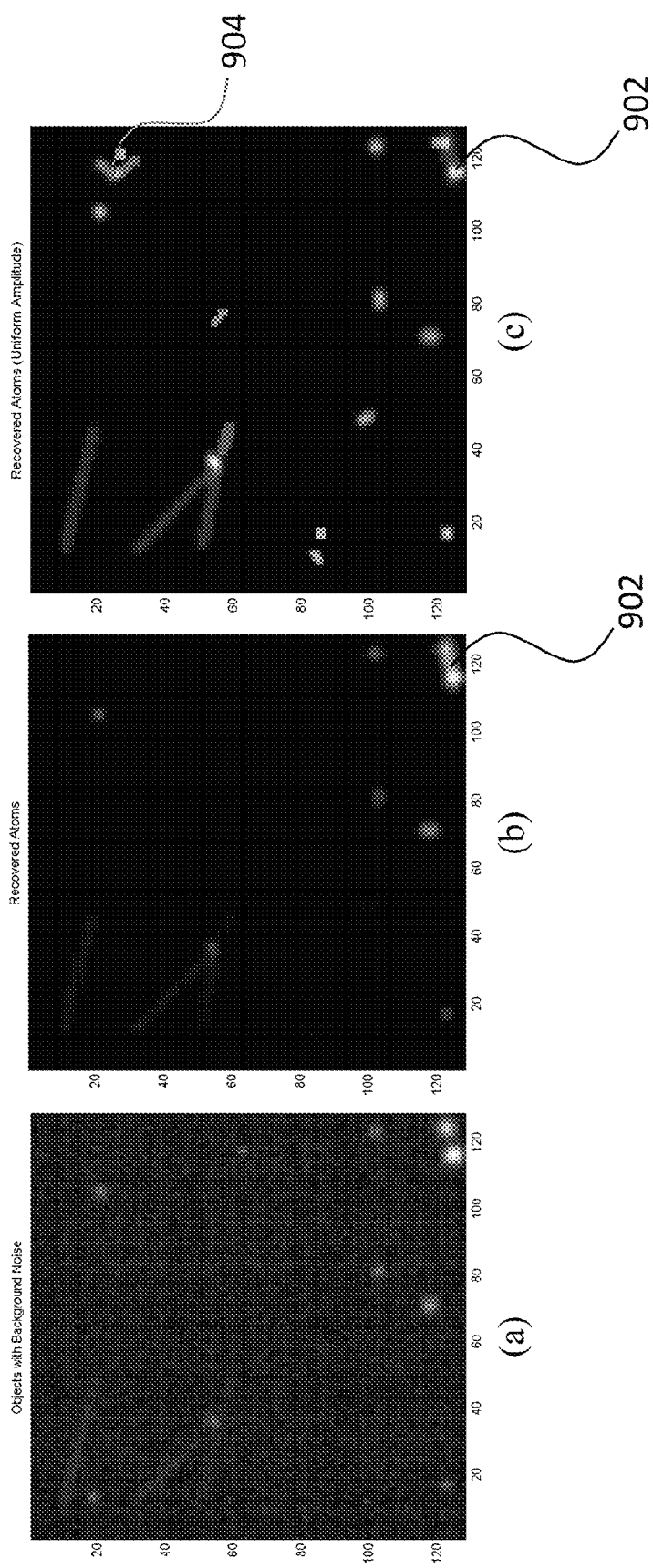
FIG. 9A is a set of graphic plots respectively showing the sample image of FIG. 8A with a first magnitude background noise, a reconstructed image of objects recovered from the sample image, and a uniformly scaled reconstructed image corresponding thereto.

These object paths are shown in brightness scale against the fixed stars without background noise in FIG. 8A, with the objects 1-3 respectively annotated as such. (Contrast is enhanced slightly to show objects.) FIG. 9A illustrates the application of the disclosed feature extraction guided sparse decomposition (namely, a disclosed embodiment for a single image configuration) to recover the moving objects' tracks from the background noise set to simulate magnitude 20 sky brightness.

Starting with the original image of FIG. 9A(a), the decomposition is run for only 20 iterative steps. FIG. 9A(b) shows the image reconstructed from the resulting sparse decomposition elements (atoms and residue). FIG. 9A(c) shows a uniformly scaled reconstruction of the image from the same atoms, or a version of the reconstructed image which as been re-normalized to ignore the fit coefficients. As illustrated, each object's path has clearly been captured and is visible as a connected row of atomic elements. The reconstructed images reveal several false positive connections between stars as indicated at 902, 904; but, they are easily filtered simply by considering the connected lengths of the line features.

The decomposition serves to concentrate moving object information into a very low-dimensional subspace. As FIG. 9A demonstrates, the decomposition does this successfully upon creating a small set of parameterized coefficients that may then be more closely examined for object detection. The decomposition may be used, therefore, to quickly enhance sky surveys to find very faint object trails for human review.

Figure 9B:
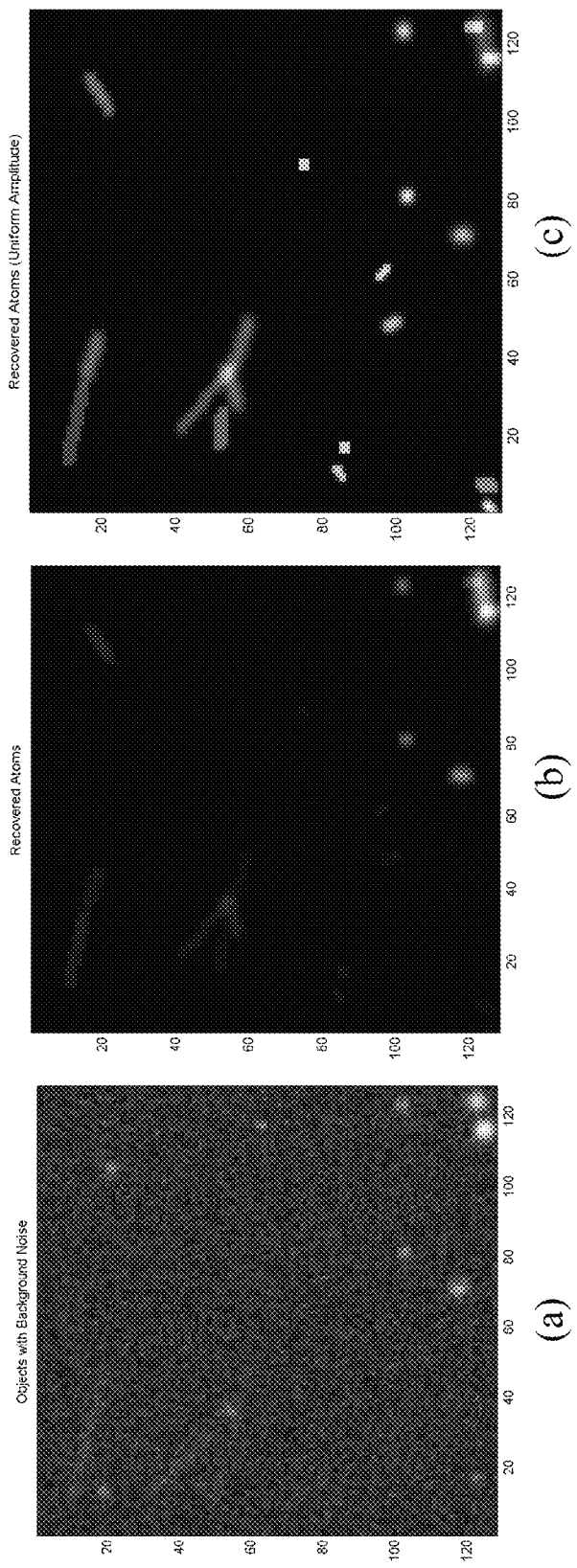
FIG. 9B is a set of graphic plots respectively showing the sample image of FIG. 8A with a second magnitude background noise, a reconstructed image of objects recovered from the sample image, and a uniformly scaled reconstructed image corresponding thereto.
Figures 1, 9A:
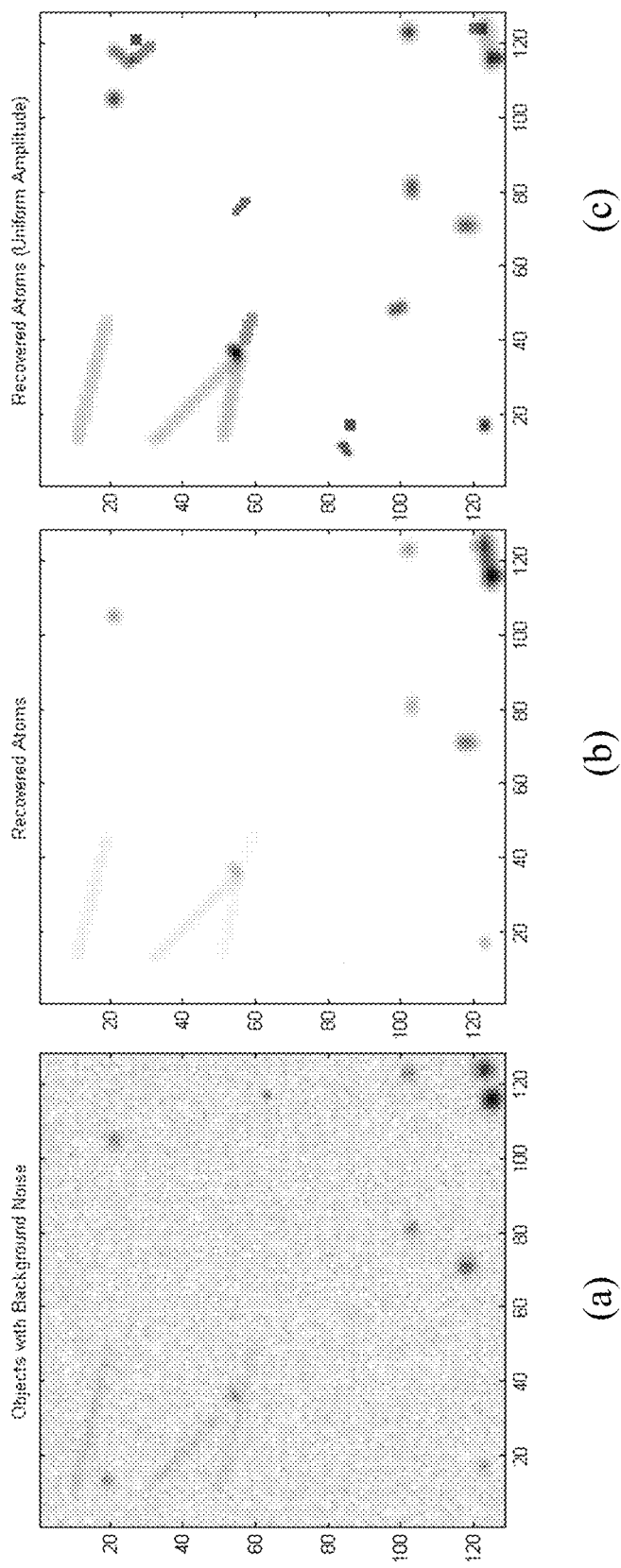
Figures 1, 9B:
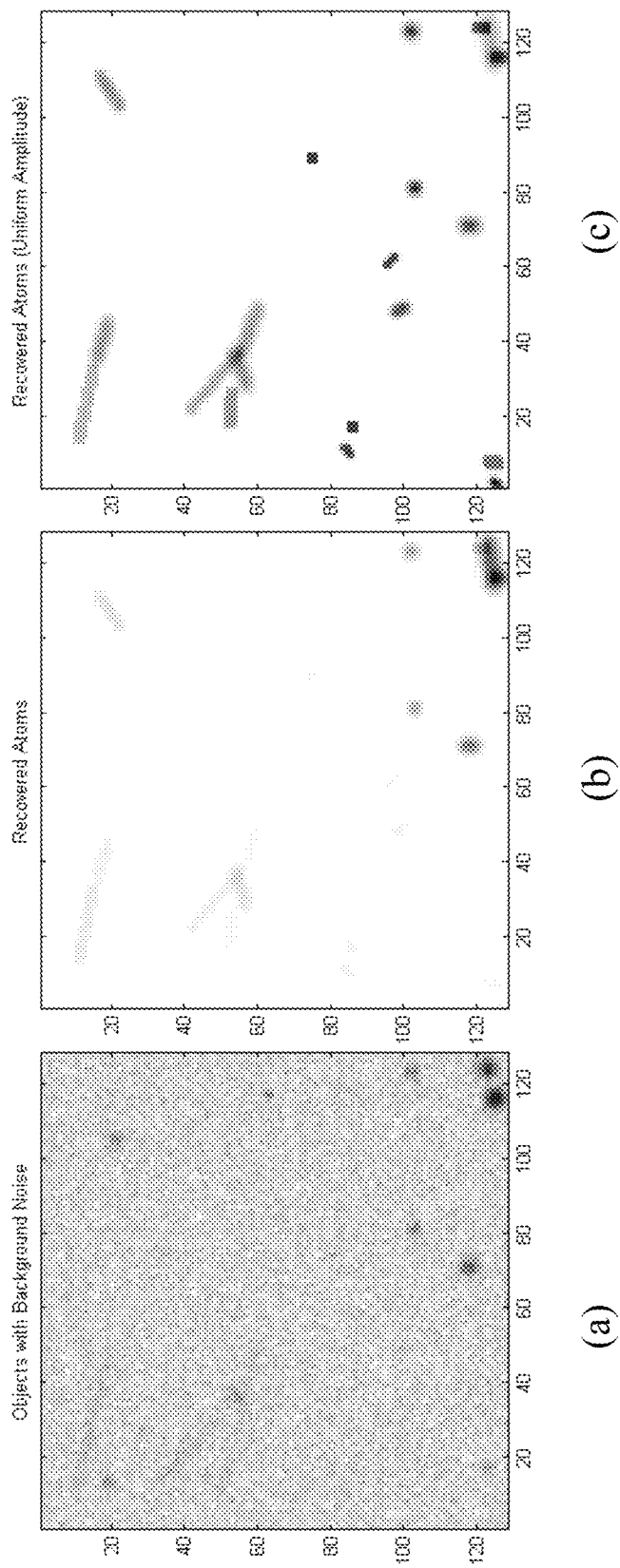

FIG. 9B shows the same data as in FIG. 9A, but in a 19.5 magnitude noise background. As FIG. 9B(a) illustrates, this makes the actual paths difficult for the human eye to pick out against the background noise. Still, FIGS. 9A(b) and 9B(c) demonstrates the decomposition's effectiveness in quickly isolating the object tracks nonetheless.

Sample Case 2. Single Object with Segmented Path

Figure 10A:
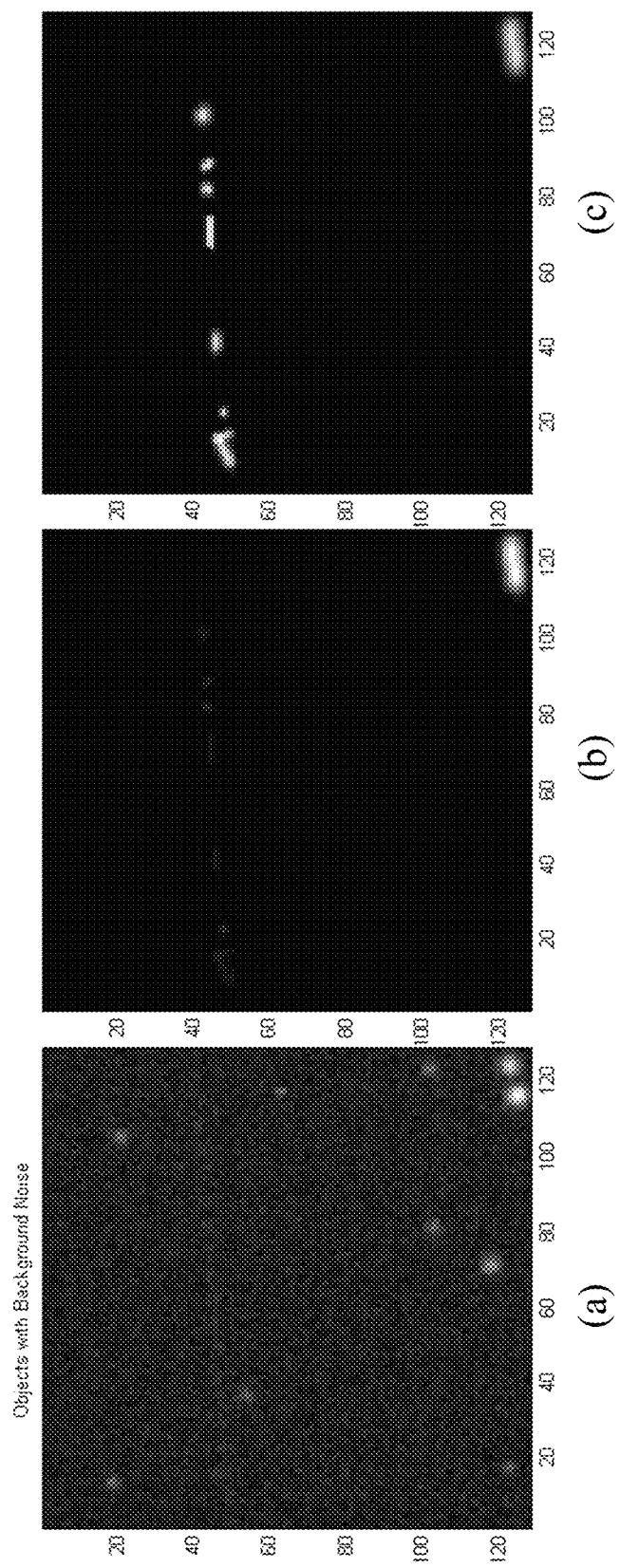
FIG. 10A is a set of graphic plots respectively showing the sample image of FIG. 8B with the first magnitude of background noise, a reconstructed image of an object recovered from the sample image, and a uniformly scaled reconstructed image corresponding thereto.

In this sample case, a single 8 cm object (object 1) is simulated against similar stars in sky background brightness of 20 m$_v$/arcsec$^2$ as in the preceding case. The object path is given a periodicity, so it does not comprise a solid line even in the original image data. This decreases the signal to noise ratio further, and specifically challenges the decomposition's ability to discriminate discontinuous line segment data. FIG. 8B shows the object and stars without noise, the object 1 being annotated as such. (Contrast is enhanced slightly in the figure to show object.) As seen in FIG. 10A(a), the path traveled by this object is again challenging to locate even when the simulated sensor data has been normalized to reveal even the dim stars in the background. However, the decomposition executes to recover major portions of the primary target track in only a few iterations (namely, 9 iterative steps). This is demonstrated in the FIGS. 10A(b) and 10(A)(c) which show, respectively, the image reconstructed from the resulting sparse decomposition elements (atoms and residue) and a uniformly scaled reconstruction of the image from the same atoms.

Figure 10B:
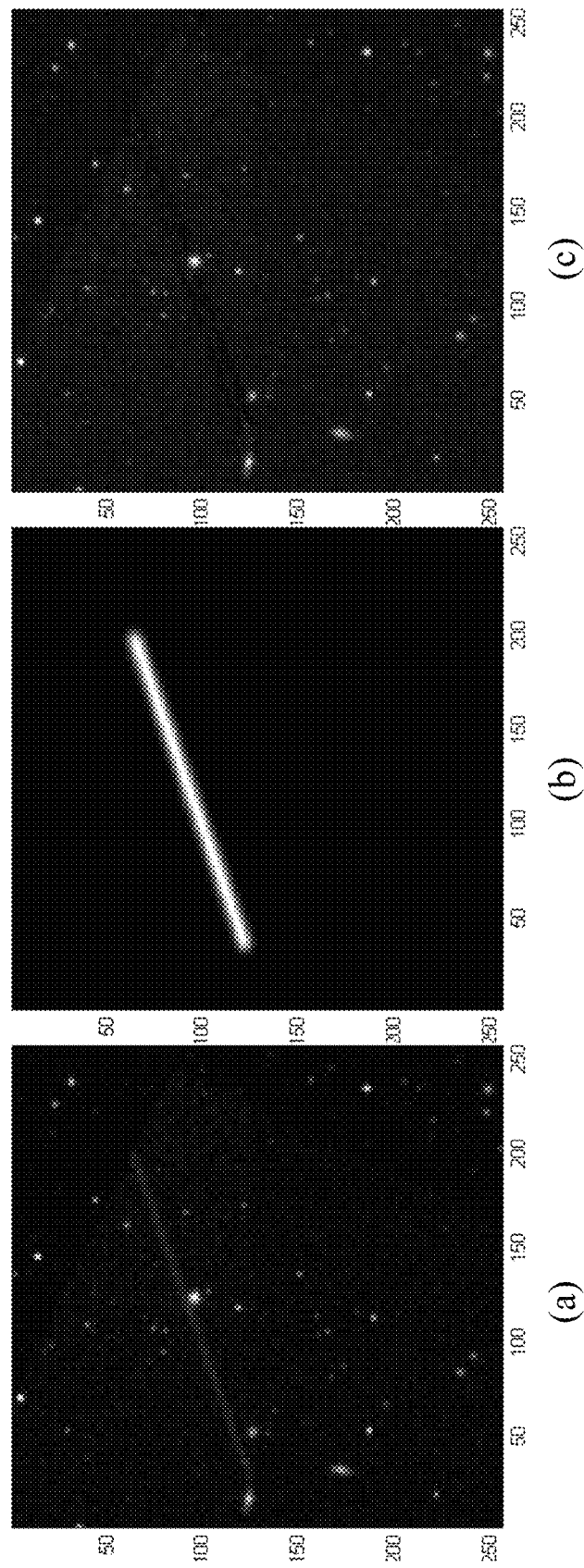
FIG. 10B is a set of graphic plots respectively showing a sample image in a third sample case containing an object in SDSS data, a reconstructed image of the object recovered from the sample image, and a uniformly scaled reconstructed image corresponding thereto.

Sample Case 3. Sloan Digital Sky Survey Data Event with Detection and Track Estimation This sample case demonstrates the decomposition's operation on actual image data. As illustrated in FIG. 10(B), the decomposition was carried out on image containing a known object in Sloan Digital Sky Survey (SDSS) data. FIG. 10B(a) shows a 256×256 portion of an SDSS image that contains an obvious LEO object 1002. FIG. 10B(b) shows an image projection of an atom found for the object 1002 in only one iterative step of the decomposition's execution. FIG. 10B(c) shows the residual image left after the first iterative step, upon extraction of the object 1002's image projection from the image data. As indicated at 1002', the decomposition fits the path of the object accurately, removing almost all trace of it from the background sky.

Figure 10C:
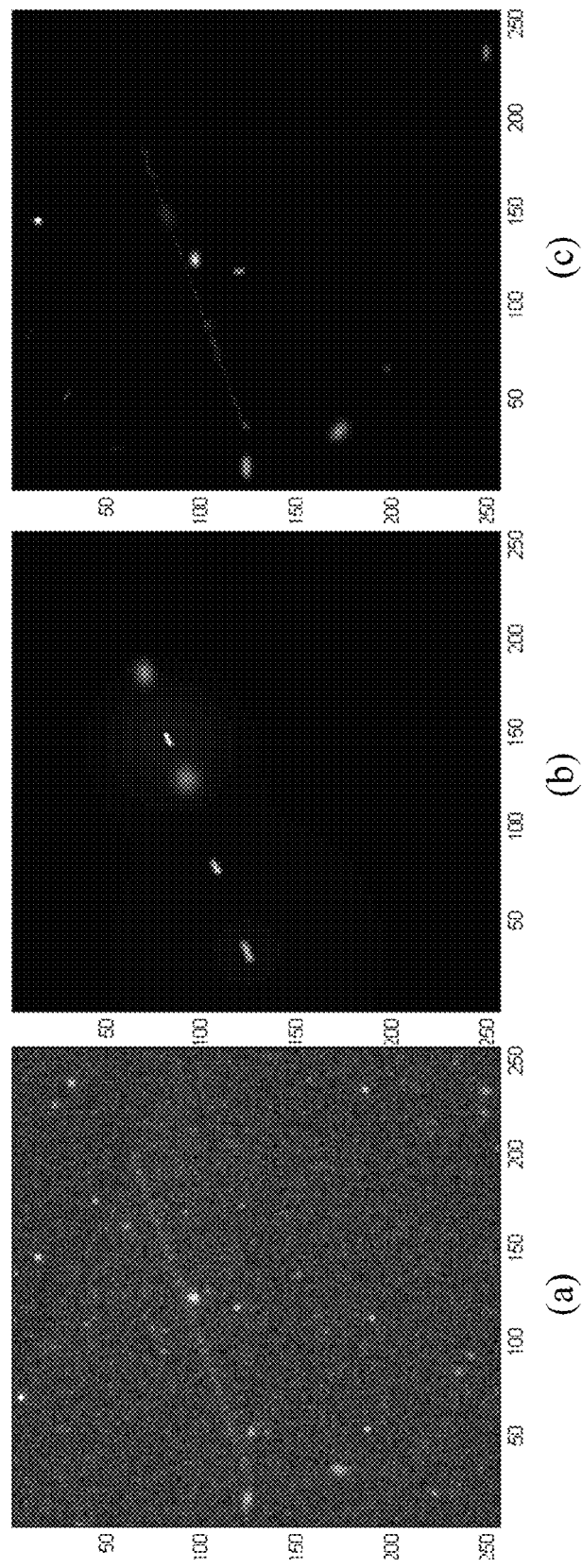
FIG. 10C is a set of graphic plots respectively showing the sample image in the third sample case containing an object in SDSS data as in FIG. 10B, but with added Poisson noise, a reconstructed image of the object recovered from the sample image, and a uniformly scaled reconstructed image corresponding thereto.
Figures 1, 10A:
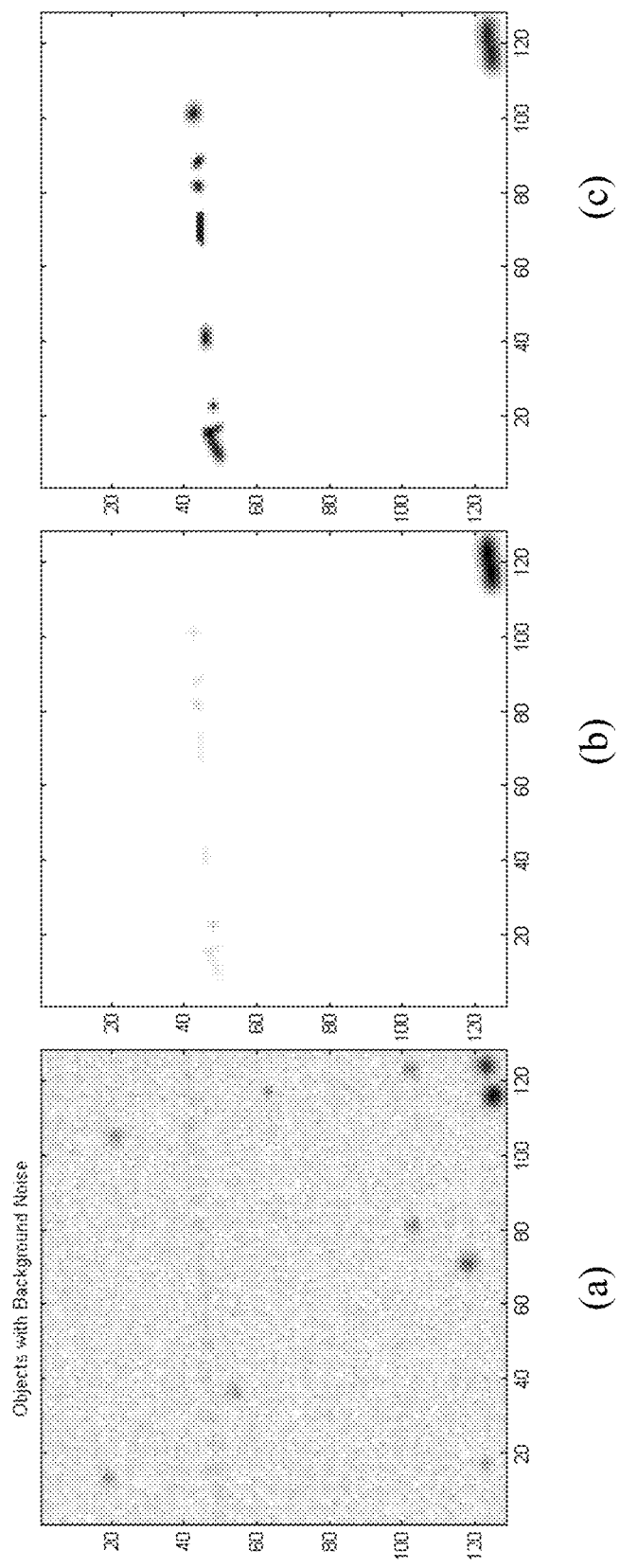
Figures 1, 10B:
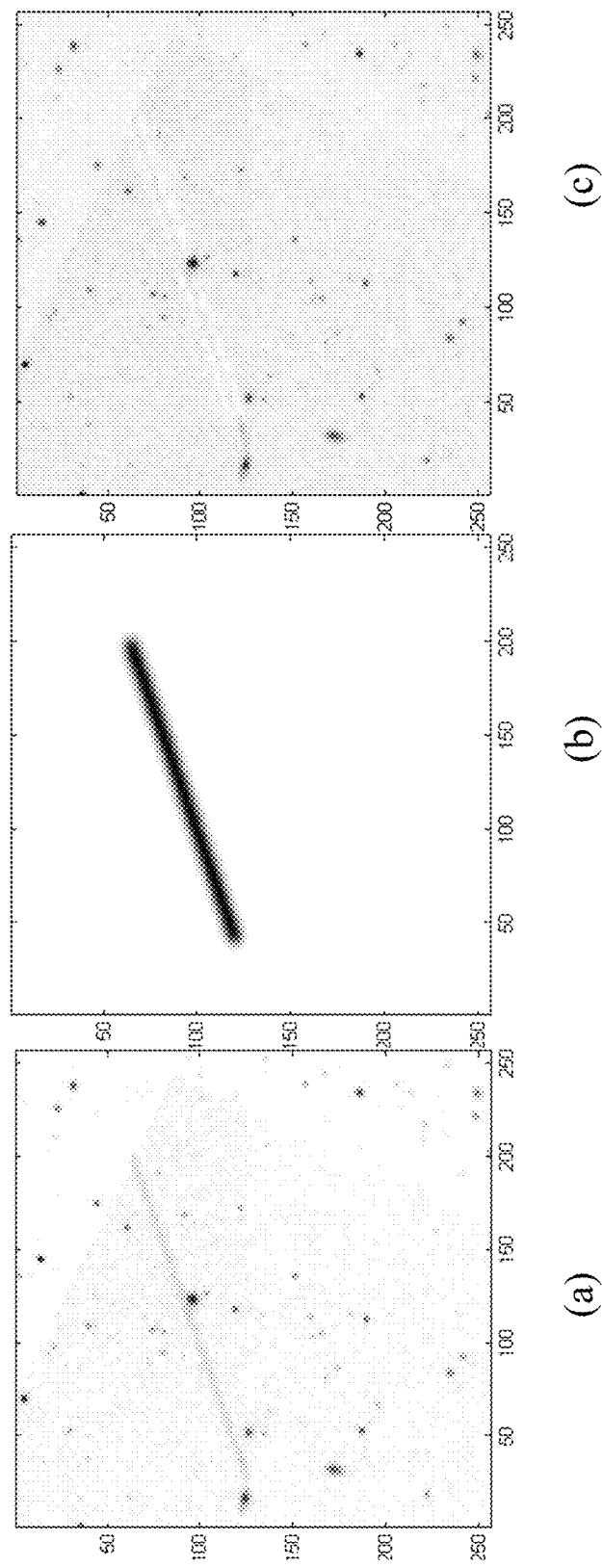
Figures 1, 10C:
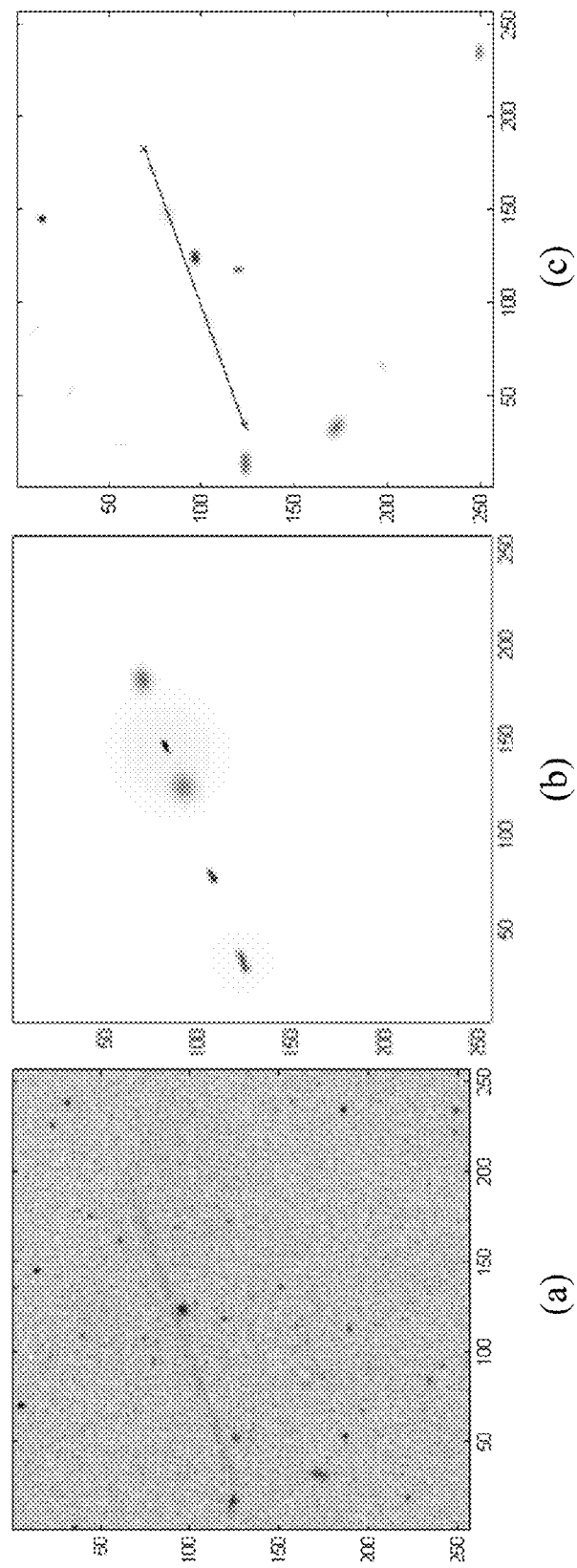

To make things more challenging, the original image was degraded. FIG. 10C(a) shows the same SDSS image 1002 (of FIG. 10B(a)) but with added Poisson noise at an energy equal to 75% of the peak value of the source image. FIG. 10C(b) shows the decomposition after only 7 iterative steps of execution finding just the feature components of interest, namely the components of the LEO object path.

FIG. 10C(c) illustrates an example of post-processing which may be applied to enhance object path detection and track estimation. After 29 decomposition steps, the resulting sparse decomposition was filtered for consistent atom scale, and a traditional Hough linear detection was applied to the approximate reconstruction. In FIG. 10C(c), the accurately estimated object path resulting from this post-processing is indicated at 1004.

As illustrated in the third sample case of FIG. 10C, approximation of an image using a partial reconstruction from the decomposition's sparse atoms leads to significant de-noising of the underlying signal. Conversely, this allows for the removal of a signal for subsequent consideration of only the background, as shown in FIG. 10B(c).

Each of the sample cases demonstrates the effective application of the subject decomposition to a single integrated exposure frame. The decomposition's sensitivity to linearly organized data may also be applied to discriminate such patterned features of interest across stacks of loosely correlated exposure frames. As described in preceding paragraphs, the frames may be obtained from either sequential exposures or from re-mapped, multi-orbit acquisitions. The decomposition's underlying Greedy Adaptive approach helps it to realize significant target detection gains even when the grouped data is only weakly correlated. One advantage to using a GAD type simultaneous sparse approximation is that the resulting decomposition capitalizes on multiple data samples to suppress noise while not blurring a signal or reducing its peak energy in the manner that direct integration of aligned images might. This gain is due to the approximation being based on parameterized atoms that are individually de-jittered and aligned during processing.

Application Example

Generalized Track Curves

Various embodiments of the decomposition disclosed herein employ an ordinary line-sensitive Hough transform and linearly directed 2D Gaussian dictionaries. In applications involving images which span relatively small FOV, this provides a very reasonable approximation of the visible paths. The decomposition may likewise be configured to discriminate parameterized curves with heightened sensitivity.

Detection and Track Estimation

The disclosed decomposition may be augmented with measures, for instance, to automatically collect component atoms into candidate LEO tracks, towards realizing a fully automated detector. Both heuristic approaches (e.g., length of coherent tracks, as illustrated in the preceding sample case 3) and machine learning approaches are addressed in that regard in following paragraphs. Machine learning approaches include, for example, the use of Support Vector Machine (SVM) learning classifiers.

Upon detection, an object is mapped by the subject decomposition to a parameterized path across an imaging surface. Combining this with orientation and time-of-day information, a suitable calculation is made to predict an orbit for the LEO object. The first detection upon execution of the decomposition provides an estimate of the orbit. The initial estimate of orbital track defines a starting point, not an endpoint. In certain embodiments, a multi-prong approach is incorporated to refine this estimate. The initial estimate may give rise to predictions as to future time points during which the object may be re-sampled. By merging data across multiple observations, the orbital path estimates obtained may be refined. For example, a Kalman-filter or particle-filter type estimation may be used to update the orbit model and detect changes.

Other tracking techniques may be incorporated to enhance the accuracy of the subject decomposition in certain embodiments. For example, imagery from multiple predicted time-points may be incorporated into a stacked dataset and the underlying parameters re-estimated. This may be accomplished using the subject decomposition to perform a simultaneous sparse approximation (SSA) across a set of roughly correlated images. In other applications, the decomposition may be used to consider simultaneous data from multiple time-points.

Quick-Detect and Track Concept

In the application examples described in preceding paragraphs, the sky survey instrument was taken to operate passively in feeding data to the decomposition. Given the minimal burden placed on computational load by the efficiencies of the subject decomposition, detection of imaged objects may be, conceivably, run in near real time. It is feasible, then, for a sky survey instrument to be quickly and automatically directed in responsive manner to begin tracking a new candidate object, and thereby provide refined imaging of the passing target. This may be carried out either before the given object leaves the visible sky, or may be scheduled for a subsequent orbit.

Other Application Examples

The subject system and method may be implemented in various embodiments to detect faint or otherwise bated features in an image such as encountered in finding object edge in low light conditions, or in low contrast machine vision situations. In orbiting object imaging applications, recovery of orbit is replaced by recovery of the line or curvilinear feature path in the image. This may be applied to other machine detection problems encountered, for example, in various robotics contexts, and in the machine guidance of vehicles on roadways via roadside tracking or traffic following.

The subject system and method may similarly be implemented in various embodiments to automatically extract information from imagery, such as man-made edges in terrain. The subject system and method may similarly be implemented in various other embodiments to detect lines in faint text on course backgrounds, where the structure of the letter pattern comprises a guide function. The feature extraction guided sparse decomposition carried out by the subject system and method provide a broadly applicable image processing tool for rapidly isolating features of interest.

General Capabilities Reflected in Various Embodiments

Certain capabilities that are or may be incorporated in the various embodiments contemplated herein are generally described with reference to FIGS. 1-6B.

Turning by way of background to FIG. 1, the data processed in accordance with the present invention is captured by any suitable means known in the art. An image, for example, may comprise only one set of values organized in an (x,y) arrangement, or in a stack of values, e.g. (Red, Green, and Blue). In multi- and hyper-spectral images, there may be any number of such values. Such stacks of values may also comprise multiple exposures and other coordinated sets discussed in certain example applications disclosed herein. Data sets forming other fields may be similarly constructed, and may be embedded in any number of dimensions rather than simply (x,y). A structure or feature of interest may potentially lie across any number of dimensions and have any orientation. Thus, the search space for finding such structures may become quite large and increasingly challenging computationally as either dimensionality or number of items in a stack increases.

Figure 2:
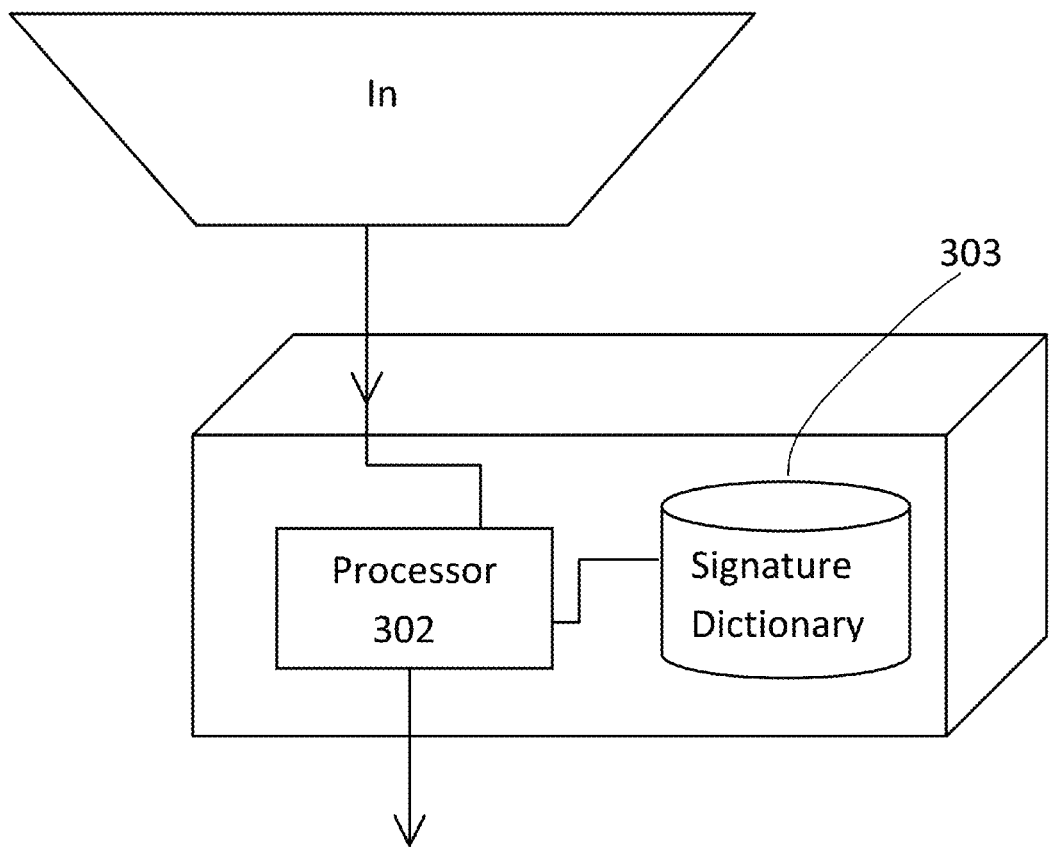
FIG. 2 is block diagram schematically illustrating an interconnection of system modules and flow of data within a sparse decomposition portion of processing.

Referring to FIG. 2, there is illustrated one aspect of a general feature discovery process. As illustrated, a collection of indexed data stacks 301 are processed by a processor 302, with reference to a signature dictionary that defines a set of patterned or structured features of interest. Each point is thereby marked with a value indicating the extent to which it contributes to each of the features of type $S_i$. A sparse representation of features inverts this relationship, so that instead of enumerating by point (x,y), the enumeration is by feature, listing only the features found (e.g., $S_1$ $S_7$ $S_{923}$) together with descriptive information necessary to recreate given features. A corresponding de-reference point $(x_0, y_0)$ maps each feature's location within the space.

Figure 3:
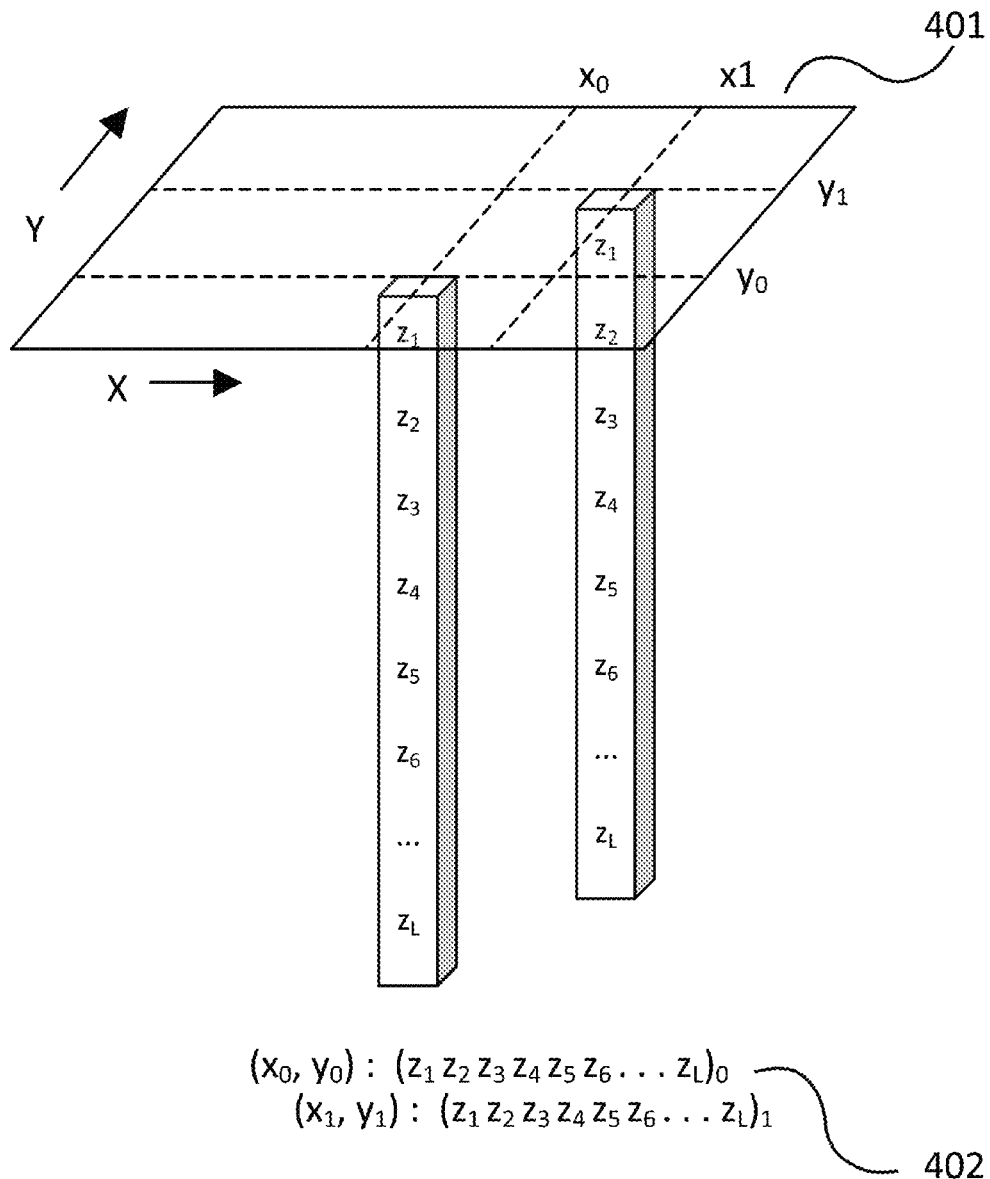
FIG. 3 is schematic diagram illustratively representing multiple pixels of image data having complex spectral content within a spatial image plane of pixels.
Figure 4:
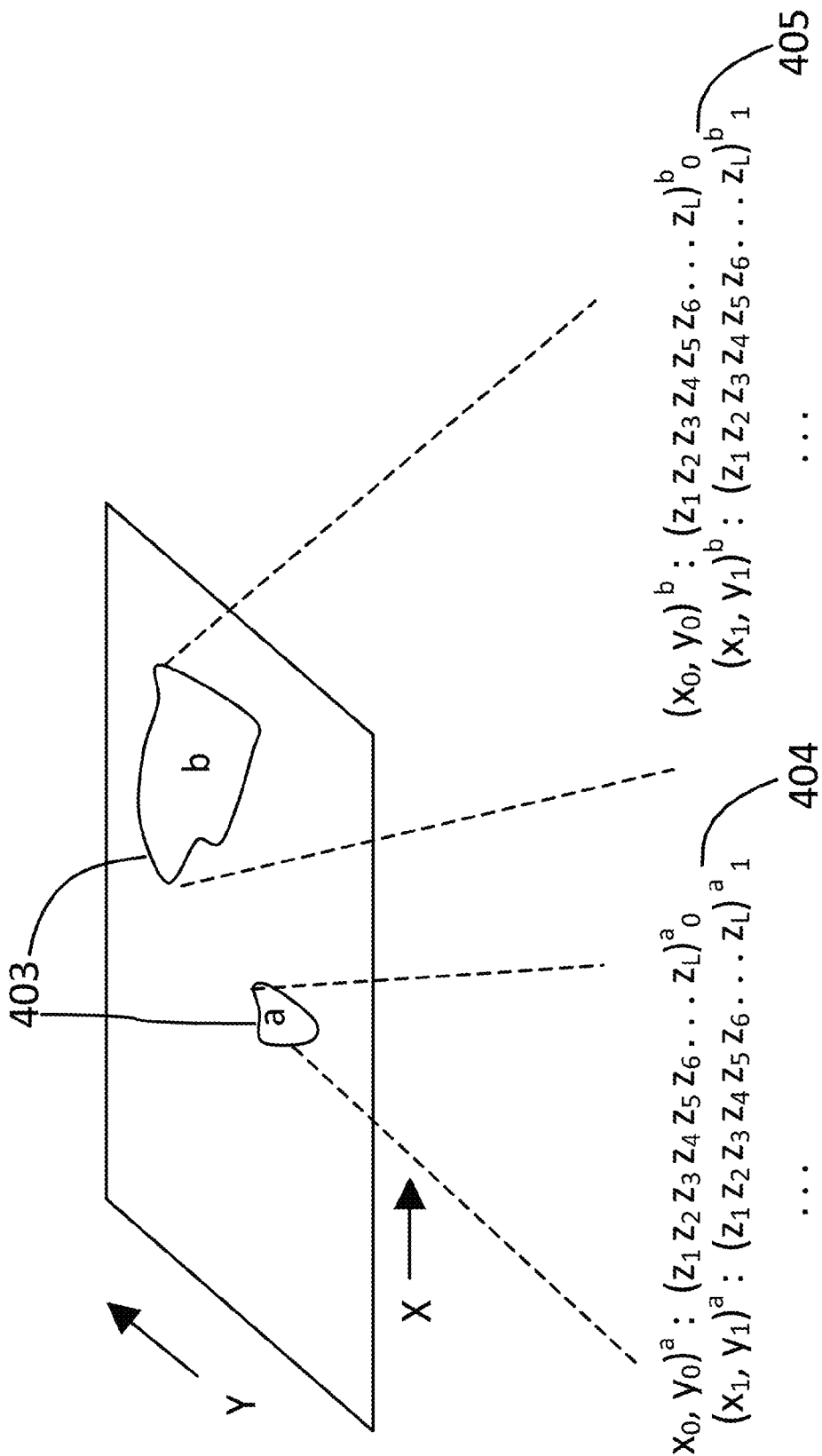
FIG. 4 is schematic diagram illustratively representing multiple grouped regions of contiguous of image pixels having complex spectral content within a spatial image plane of pixels.

Referring to FIGS. 3-4, in the exemplary applications herein addressed, the features/feature sets of interest include those formed by structured sets of points within image or other data sets. FIG. 3 illustrates two such points that have corresponding representations across the image stack. While they are shown to be aligned vertically for simplicity of illustration, slight variations may be accommodated in both intensity and location over the various layers of an image. As indicated by FIG. 4, the features of interest may span any number of connected or unconnected spatial sets. They may form lines, curves, closed curves, polygons, or filled regions comprising any pattern or structure of interest.

Mechanisms and methods for discovering and extracting signatures in data are described in [1] and [2]. The set of methods are described collectively herein as Greedy Adaptive Discrimination ("GAD"). Below is a general discussion of certain considerations in signature and target extraction, and a brief summary the GAD processing disclosed in more detail in [1] and [2], aspects of which are incorporated in the embodiments disclosed herein.

Signature and Target Extraction Considerations

Figure 6A:
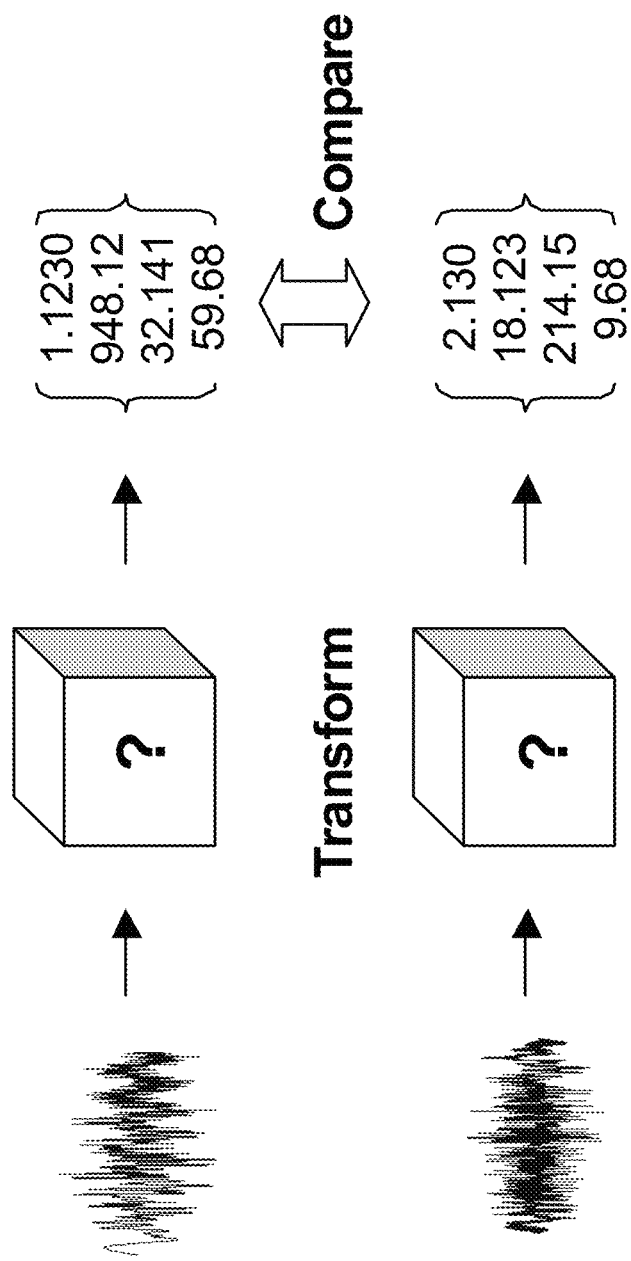
FIG. 6A is a schematic diagram generally illustrating a transformation process respectively applied to signal groups to obtain transformed representations thereof.

A considerable challenge in performing detection and classification in high-dimensional spaces is discovering and leveraging natural relationships which may be used to reduce the dimensionality of the data to a manageable decision space. It is preferable to concentrate the decisive information content into relatively few coefficients. Mathematically, one assumes that the target information lies on a relatively low-dimensional manifold that is embedded in the high-dimensional space. Practically, many approaches are known by which one may attempt to reduce raw data to the salient information. FIG. 6A schematically illustrates the abstracted process of analysis in this regard. As illustrated, sample signals are transformed so that they are represented by a set of features with corresponding values. This representation is then manipulated to discover group similarities and differences so that a "typical" signature may be extracted. Use of an optimal transform to map signals into features is important to the given system's successful signature discovery.

Figure 6B:
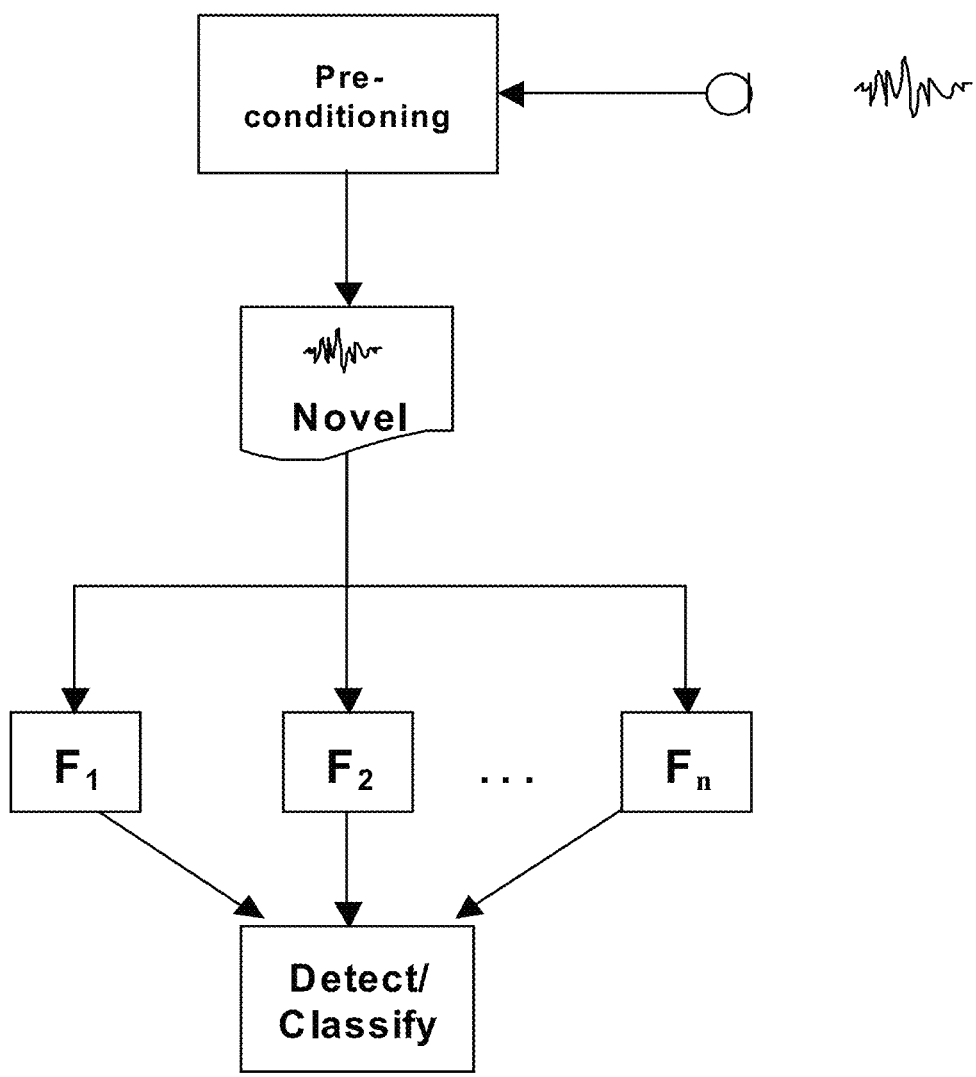
FIG. 6B is a flow diagram schematically illustrating a flow of processes within a general detection and classification scheme.

Ideally, once a good feature set is identified, a model similar to that illustrated in FIG. 6B may be employed for detection and classification, where low-dimensional feature sets are used to perform the detection and classification/clustering. Classic signal processing relies on fixed transforms and generally requires a pattern across many features to establish a signature. In contrast, GAD is highly data adaptive and often succeeds in discovering a transform that maps complex signals down to as few as two salient features that jointly provide highly accurate class distinctions.

Standard signal processing tools based on fixed transforms (such as FFTs, wavelets, or filter banks) potentially obscure key feature information by distributing it over a large number of quantized bins. Approaches like Principal Component Analysis (PCA), Linear Discriminate Analysis (LDA), and related nonlinear kernel methods share certain downsides with all statistical matching methods. Even though the data may be transformed to reduce dimensionality, these methods remain dependent on consistency in the sampled feature set. If selected features jitter, drift, or otherwise vary significantly, the probability of resolving underlying structure or of detecting a known signature diminishes rapidly.

In contrast, sparse greedy algorithms are known to concentrate interesting information into fewer, more robust features. Sparse decomposition algorithms have heretofore been underutilized in signature identification tasks in part because of the invariable difficulty in comparing one analyzed signal to another when different features are extracted. As disclosed in [1], it is possible to create a greedy analysis algorithm that simultaneously analyzes collections of signals and overcomes these limitations. The GAD processing disclosed herein removes inherent sample acquisition jitter and variation, and de-blurs underlying common information. By compactly re-representing the data in a reduced dimensional feature space, GAD processing facilitates discovery of signatures at the front end, reduces subsequent computing costs, and significantly increases the probability of success with further classification and detection processing.

Greedy Adaptive Approximation (GAD) Processing Summary

The main elements of GAD approximation include a "GAD engine," comprising a Simultaneous Sparse Approximator ("SSA"), a dictionary of prototypical atoms, a memory system for representing approximated signals termed for reference purposes a "structure book," and one or more discrimination functions that operate on the structure books. The SSA takes as input a collection of signals and produces as output a low-dimensional structure book for each signal, as illustratively disclosed in [1] and [2]. The term "signal" is used generally herein, referring to any input data set which may comprise, for example, an image.

Each structure book describes a decomposition of a corresponding signal and comprises a list of coefficients and a corresponding list of atoms. Working as an example in one dimension, we may write a signal f(t) as, $$f(t) = a_0 g_0 + a_1 g_1 + \ldots + a_n g_n + r,$$

where $a_i$ are the coefficients and $g_i(t)$ the atoms or prototype-signals of the decomposition, and R is the residual error (if any) after n+1 terms. If r(t), then the representation is exact; otherwise the decomposition is an approximation of f(t). One way to understand a structure book is as a set of ordered pairs, $(a_i, g_i(t))$ for each i; however, the actual engine utilizes more efficient internal coding schemes. Note that while the output of the SSA may be orthogonalized, the present application will be best served by maintaining redundant representation, sometimes referred to as a frame in mathematical literature to distinguish it from the more familiar idea of a vector basis.

The atoms $g_i(t)$ belong to a highly redundant dictionary D of prototype signal elements. Using a redundant source dictionary rather than a fixed decomposition set (such as a Fourier or wavelet basis) allows the algorithm to substantially reduce the dimensionality n of the resulting decomposition for a given error $\epsilon$, with $|r|<\epsilon$. Readers familiar with other adaptive approximation schemes, such as Matching Pursuits [17], will recognize that this reduced dimensionality generally comes at a price; structure books from multiple signals are not mutually compatible. A unique feature of the GAD architecture is an SSA that produces redundant sparse approximations such that the atoms of any structure book may be compared directly to those of any other in a very low-dimensional space. Thus, for a set of simultaneously approximated data functions $\{f^i\}$, decomposed over an index set $\gamma \in S$ we may write, $$f^i = \sum_{\gamma \in S} a^i_\gamma g^i_\gamma + r.$$

In the simplest implementation, selected atoms may be identical for all generated structure books in the collection. However, the GAD SSA is also able to extract atoms from the signal collection that are similar rather than identical, i.e. $g^i_\gamma \neq g^j_\gamma, i \neq j$. This unique feature is highly advantageous because it allows the approximation to automatically account for noise, jitter, drift, and measurement error between the signals. The GAD Engine permits the range of "similarity" between atoms across structure books to be controlled by setting $\Delta$-windows for the parameters of the dictionary. These windows may be either fixed or adapted dynamically.

The resulting sparse structure books are further processed within the GAD engine by discrimination operations. Each operation takes as input one or more structure books and produces as output one or more additional structure books. Operators include set theoretic operations and threshold tests, among others, that are utilized to sub-select atoms and extract similarities and differences between classes of signals. An operation of particular interest for signature extraction is the parametric mean, detailed in [1], which produces a single structure book representative of the "average" or "typical" signal in a collection.

Another notable benefit of the GAD Engine is that the resulting structure books may be averaged, subtracted, or otherwise manipulated, and any derived structure book retains sufficient information to reconstruct a representative model signal in the original signal space. In particular, this means it is possible to calculate a parametric mean of a class of signals and then reconstruct a "typical" signature signal from that data for further analysis, comparison, etc. Hence, GAD can provide useful signature information to many conventional signal discrimination systems.

Taken together, the GAD Engine components define a very flexible tool for manipulating and discriminating signals. These proprietary and patented methods are adapted for the various embodiments of the system and method disclosed herein to suit the need for robust, field deployable detection.

Figure 5:
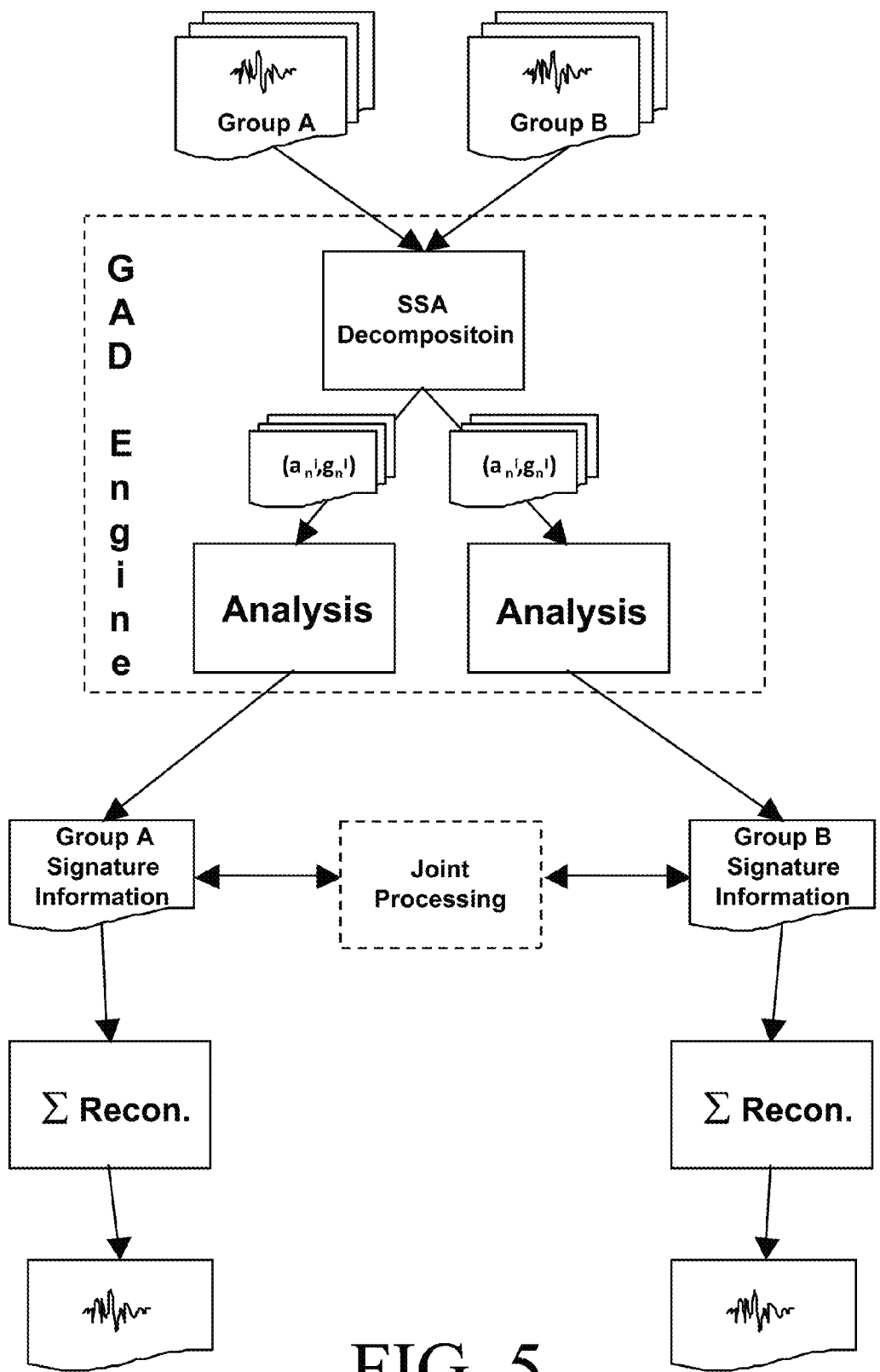
FIG. 5 is flow diagram schematically illustrating a flow of processes within a simultaneous sparse approximation scheme.

FIG. 5 schematically illustrates the interconnection of certain functional components in an exemplary implementation of GAD signature extraction approach. This schema is applicable in post processing the output of the decomposition disclosed herein for signature discovery and other applications. In particular, certain aspects of the SSA decomposition module would, in this instance, be reflected in the simultaneous Feature Extraction Guided Sparse Decomposition system and method herein disclosed. Signature data in this example is collected and divided into classes, typically representing a positive condition in which the target signature is present and a negative condition in which only background or distracter signals are present. The classes are analyzed using our SSA method, resulting in a collection of structure books (labeled signature books in the figures) for each class of signal. A carefully defined parametric-mean operation is carried out on each class to produce signature structure books for each signal class. As discussed previously, these signature structure books are effectively include a list of key time-frequency features relevant to discriminating the class, together with coefficient values indicating their proportionate prominence. The given processor may then compare the signature structure books to further extract contrasting elements. Note that the system may also be applied spatially to extract spatial as well as temporal patterns of interest. The signature structure books may also be reconstructed into "typical" examples that are representative of a class of signals. Thus GAD signature extraction may feed a variety of other detector designs.

GAD signature extraction proceeds by finding a parametric mean for one or more classes of signals and comparing the resulting structure books to each other and to statistical estimates of expected values in background noise. Various detector/classifier architectures may be suitably used as tools in this regard.

Generally, to apply these GAD methods in accordance with certain aspects of the present invention, a collection of pixels known to contain the same material are preferably grouped. In the disclosed embodiments, this would constitute the image data points of each particular candidate grouping during iterative execution. A joint sparse approximation is executed thereon to find a sparse working space in which to compare and analyze the resulting signatures. By manipulating this space using described techniques, application of the GAD methods in accordance with the present invention produces a description of spatial commonalities amongst pixels belonging to the group, which comprises a signature. This signature may further refined by applying the processes described herein to compare commonalities to typical signatures found in either background noise or in a separately selected and grouped set of likely false-positive confusion pixels for comparison. The refined signature produced by GAD in that event will typically include only those elements that are common to a true-positive group and not generally present in the comparison or background group.

Forming a "group" herein—as described in [1] and [2]—refers generally to taking a given set of pixels together as a set for purposes of processing. Grouped pixels need not be contiguous with each other in the (x, y) spatial dimension. They just need to be 'connected' in the sense that they collectively define, at least potentially, a feature of interest. That is, pixels in a processing group may or may not be spatially grouped; it is only necessary that they be assigned (by any suitable means) and treated as such as part of the same processing set (i.e. "group").

The resulting dictionary signatures are preferably described in terms of structure book entries established relative to the general dictionary. They may (according to GAD in [1] and [2]) be stored either with respect to indexing by those components of the general dictionary or may be mapped back into complete data vectors in the original observed spectral domain. The latter approach creates direct signature patterns as vectors stored in memory that are easily understood by a human operator and may be used in a matched filter type detector. The former approach of indexing to elements of the general dictionary provides additional flexibility in signature detection, and described in preceding paragraphs.

As will be apparent having understood the disclosed approach, one may also consider data sets in other dimensions. For example, one may use defined connected spatial lines drawn arbitrarily through the data cube and extract one local vector for each spectral wavelength of interest. The method will be equally useful in processing in the spatial dimension or in any other combination dimension taken through a cube or other high dimensional dataset.

Depending on the particular application intended, the subject system and method may employ a variety of specific decomposition approaches. These include, without limitation, Sparse Approximation (SA) and Simultaneous Sparse Approximation (SSA) mechanisms and suitable variations thereof. Moreover, the system and method described herein will have broad application apparent to those skilled in the art once they have understood the present disclosure. Upon reviewing the novel combinations of elements disclosed in the specification and figures and the teachings herein, it will be clear to those skilled in the art that there are many ways in which the subject invitation can be implemented and applied. The above description relates to the preferred modes and example embodiments of the invention.

The descriptions above are intended to illustrate possible implementations of the present invention and are not restrictive. The inventor contemplates variations and additional features and functions within the skill of the art, including advances in operational technology. Although the invention has been described in connection with specific forms and embodiments thereof, it will be appreciated that variations, modifications, and alternatives other than those discussed above may be resorted to without departing from the spirit or scope of the invention. Such variations, modifications, and alternatives will become apparent to the skilled artisan upon review of this disclosure. For example, equivalent elements may be substituted for those specifically shown and described. Certain features may be used independently of other features, various methods independently described may be combined, and in certain cases, particular locations of elements may be reversed or interposed, all without departing from the spirit or scope of the invention as defined in the appended claims. The scope of the invention should therefore be determined with reference to the description above and the appended claims, along with their full range of equivalents.

What is claimed is:

1. A system for uncued discrimination of a bated spatial pattern in an image electronically rendered as a frame of image data points, comprising:

a reference unit formulating a general dictionary of predefined multi-dimensional reference functions;

a candidate detection unit pre-screening the frame of image data points to identify therein at least one candidate grouping of image data points collectively indicative of a predetermined spatial pattern; and, a sparse approximation unit coupled to said candidate detection unit and said reference unit, said sparse approximation unit computing for each said candidate grouping an optimal reference function defined with respect to said general dictionary, said sparse approximation unit projecting said optimal reference function of each said candidate grouping onto a corresponding portion of the image data frame defined thereby, each projected portion being extracted from the image data frame to leave a residual image data frame;

wherein during iterative execution of said candidate detection and sparse approximation units, the residual image data frame of each iteration provides the image data frame for the immediately succeeding iteration.

2. The system as recited in claim 1, wherein during each iteration of execution:

said candidate detection unit carries out a predetermined transformation of the image data frame for the iteration, and comparatively analyzes portions of the transformed image data frame to estimate a set of said image data point groupings each potentially delineating said predetermined spatial pattern; and, said sparse approximation unit selectively assigns each said estimated image data point grouping as a candidate image data point grouping according to predetermined amplitude criteria for the projection of said optimal reference function of said estimated image data point grouping onto said corresponding portion of the image data frame defined thereby.

3. The system as recited in claim 2, wherein said candidate detection unit applies a Hough transform to the image data frame for each iteration of execution.

4. The system as recited in claim 2, wherein said sparse approximation unit adaptively establishes for the estimated set of image data point groupings of each iteration of execution an index dictionary defined by a plurality of index reference functions selected from said general dictionary, each said index reference function being consistent with at least one of said image data point groupings in the estimated set for the iteration.

5. The system as recited in claim 4, wherein said sparse approximation unit selects each said optimum reference function during an iteration of execution from said index dictionary generated therefor, said sparse approximation unit computing optimal reference function as a supremum of respective inner products of each said index reference function and the image data frame of the iteration.

6. The system as recited in claim 5, wherein said sparse approximation unit monitors said candidate groupings of image data points of each iteration of execution relative to a predetermined detection amplitude, discarding any candidate groupings having an inner product of said optimal reference function thereof and the image data frame of the iteration less than said predetermined detection amplitude.

7. The system as recited in claim 3, wherein said candidate detection unit during each iteration of execution generates an image threshold matrix corresponding in dimensional size to said image data frame, said image threshold matrix including a plurality of constituent elements each having a binary value corresponding one of said image data points in said image data frame, each binary value indicating the state of said corresponding image data point in amplitude with respect to a predetermined threshold level; said Hough transform being applied to said image threshold matrix.

8. The system as recited in claim 7, wherein said candidate detection unit during each iteration of execution estimates each said candidate grouping of image data points responsive to detection of a peak in the Hough transformation of the image threshold matrix.

9. The system as recited in claim 7, wherein said candidate detection unit during each iteration of execution normalizes the Hough transformation of the image threshold matrix and estimates each said candidate grouping of image data points responsive to detection of a peak in the normalized Hough transformation of the image threshold matrix.

10. The system as recited in claim 1, further comprising a reconstruction unit coupled to said sparse approximation unit, said reconstruction unit collecting each said extracted portion of the image data frame generated upon iterative execution of said candidate detection and sparse approximation units, said reconstruction unit combining said extracted portions of the image data frame collected over a predetermined number of iterative executions for forming a reconstructed image data frame containing the spatial pattern.

11. The system as recited in claim 1, wherein said candidate detection unit pre-screens a collection of weakly correlated image data frames to identify at least one candidate grouping of image data points for the collection during each iteration of execution; and, wherein:
said candidate detection unit carries out a predetermined transformation of each image data frame of the collection for the iteration, and comparatively analyzes portions of the transformed image data frame to jointly estimate for the collection a set of said image data point groupings each potentially delineating said predetermined spatial pattern; and,
said sparse approximation unit selectively assigns each said estimated image data point grouping as a candidate image data point grouping according to predetermined amplitude criteria for the projection of said optimal reference function of said estimated image data point grouping onto said corresponding portion of the image data frame defined thereby.

12. The system as recited in claim 1, wherein said candidate detection unit pre-screens a collection of weakly correlated image data frames to identify at least one candidate grouping of image data points for the collection during each iteration of execution; and, wherein:
said candidate detection unit carries out a predetermined transformation of each image data frame of the collection for the iteration, and comparatively analyzes portions of the transformed image data frame to independently estimate for each image data frame a set of said image data point groupings each potentially delineating said predetermined spatial pattern; and,
said sparse approximation unit selectively assigns each said estimated image data point grouping as a candidate image data point grouping according to predetermined amplitude criteria for the projection of said optimal reference function of said estimated image data point grouping onto said corresponding portion of the image data frame defined thereby.

13. A method for uncued discrimination of a bated spatial pattern in an image electronically rendered as a frame of image data points, comprising the steps of:
establishing a general dictionary of predefined multi-dimensional reference functions;
executing candidate detection in a processor to pre-screen the frame of image data points to identify therein at least one candidate grouping of image data points collectively indicative of a predetermined spatial pattern; and,
executing sparse approximation in a processor to compute for each said candidate grouping an optimal reference function defined with respect to said general dictionary, said sparse approximation including projecting said optimal reference function of each said candidate grouping onto a corresponding portion of the image data frame defined thereby, each projected portion being extracted from the image data frame to leave a residual image data frame;
wherein during iterative execution of said candidate detection and sparse approximation, the residual image data frame of each iteration provides the image data frame for the immediately succeeding iteration.

14. The method as recited in claim 13, wherein during each iteration of execution:
said candidate detection includes executing a predetermined transformation of the image data frame for the iteration, and comparative analyzing portions of the transformed image data frame to estimate a set of said image data point groupings each potentially delineating said predetermined spatial pattern; and,
said sparse approximation includes selectively assigning each said estimated image data point grouping as a candidate image data point grouping according to predetermined amplitude criteria for the projection of said optimal reference function of said estimated image data point grouping onto said corresponding portion of the image data frame defined thereby.

15. The method as recited in claim 14, wherein said candidate detection includes applying a Hough transform to the image data frame for each iteration of execution.

16. The method as recited in claim 14, wherein said sparse approximation includes adaptively establishes for the estimated set of image data point groupings of each iteration of execution an index dictionary defined by a plurality of index reference functions selected from said general dictionary, each said index reference function being consistent with at least one of said image data point groupings in the estimated set for the iteration.

17. The method as recited in claim 16, wherein said sparse approximation includes selecting each said optimum reference function during an iteration of execution from said index dictionary generated therefor, said sparse approximation including computing optimal reference function as a supremum of respective inner products of each said index reference function and the image data frame of the iteration.

18. The method as recited in claim 17, wherein said sparse approximation includes monitoring said candidate groupings of image data points of each iteration of execution relative to a predetermined detection amplitude, discarding any candidate groupings having an inner product of said optimal reference function thereof and the image data frame of the iteration less than said predetermined detection amplitude.

19. The method as recited in claim 15, wherein said candidate detection during each iteration of execution includes generating an image threshold matrix corresponding in dimensional size to said image data frame, said image threshold matrix including a plurality of constituent elements each having a binary value corresponding to one of said image data points in said image data frame, each binary value indicating the state of said corresponding image data point in amplitude with respect to a predetermined threshold level; said Hough transform being applied to said image threshold matrix.

20. The method as recited in claim 19, wherein said candidate detection during each iteration of execution includes estimating each said candidate grouping of image data points responsive to detection of a peak in the Hough transformation of the image threshold matrix.

21. The method as recited in claim 19, wherein said candidate detection during each iteration of execution includes normalizing the Hough transformation of the image threshold matrix and estimating each said candidate grouping of image data points responsive to detection of a peak in the normalized Hough transformation of the image threshold matrix.

22. The method as recited in claim 13, further comprising the steps of:
    collecting each said extracted portion of the image data frame generated upon iterative execution of said candidate detection and sparse approximation; and,
    combining said extracted portions of the image data frame collected over a predetermined number of iterative executions for forming a reconstructed image data frame containing the spatial pattern.

23. The method as recited in claim 13, wherein a collection of weakly correlated image data frames are pre-screened to identify at least one candidate grouping of image data points for the collection during each iteration of execution; and, wherein:
    a predetermined transformation of each image data frame of the collection is executed for the iteration, and portions of the transformed image data frame are comparatively analyzed to jointly estimate for the collection a set of said image data point groupings each potentially delineating said predetermined spatial pattern; and,
    selectively assigning each said estimated image data point grouping as a candidate image data point grouping according to predetermined amplitude criteria for the projection of said optimal reference function of said estimated image data point grouping onto said corresponding portion of the image data frame defined thereby.

24. The method as recited in claim 13, wherein a collection of weakly correlated image data frames are pre-screened to identify at least one candidate grouping of image data points for the collection during each iteration of execution; and, wherein:
    a predetermined transformation of each image data frame of the collection is executed for the iteration, and portions of the transformed image data frame are comparatively analyzed to independently estimate for each image data frame a set of said image data point groupings each potentially delineating said predetermined spatial pattern; and,
    selectively assigning each said estimated image data point grouping as a candidate image data point grouping according to predetermined amplitude criteria for the projection of said optimal reference function of said estimated image data point grouping onto said corresponding portion of the image data frame defined thereby.

25. A method for uncued discrimination of a bated structural feature in a frame of spatially referenced data points, comprising the steps of:
    establishing a general dictionary of predefined multi-dimensional reference functions;
    executing candidate detection in a processor to pre-screen the frame of spatially referenced data points to identify therein at least one candidate grouping of data points collectively indicative of a predetermined structural feature; and,
    executing sparse approximation in a processor to compute for each said candidate grouping an optimal reference function defined with respect to said general dictionary, said sparse approximation including projecting said optimal reference function of each said candidate grouping onto a corresponding portion of the data frame defined thereby, each projected portion being extracted from the data frame to leave a residual data frame;
    wherein during iterative execution of said candidate detection and sparse approximation, the residual data frame of each iteration provides the data frame for the immediately succeeding iteration.

* * * * *